(12) United States Patent
Lockwood et al.

(10) Patent No.: US 11,461,279 B2
(45) Date of Patent: Oct. 4, 2022

(54) SHARE POOLS FOR SHARING FILES VIA A STORAGE SERVICE

(71) Applicant: Apple Inc., Cupertino, CA (US)

(72) Inventors: James F. Lockwood, San Francisco, CA (US); Van Hong, Sunnyvale, CA (US); Xiaonan Ma, Sunnyvale, CA (US); Sugam Jain, San Francisco, CA (US); Pavel V. Dudrenov, San Francisco, CA (US); Ori Herrnstadt, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 592 days.

(21) Appl. No.: 16/146,588

(22) Filed: Sep. 28, 2018

(65) Prior Publication Data

US 2019/0294700 A1    Sep. 26, 2019

Related U.S. Application Data

(60) Provisional application No. 62/648,364, filed on Mar. 26, 2018.

(51) Int. Cl.
  *G06F 16/176* (2019.01)
  *G09B 5/08* (2006.01)
  *H04L 67/1097* (2022.01)
  *H04L 67/01* (2022.01)

(52) U.S. Cl.
  CPC ............. *G06F 16/176* (2019.01); *G09B 5/08* (2013.01); *H04L 67/01* (2022.05); *H04L 67/1097* (2013.01)

(58) Field of Classification Search
  None
  See application file for complete search history.

(56) References Cited

U.S. PATENT DOCUMENTS

| | | | |
|---|---|---|---|
| 7,293,133 B1 * | 11/2007 | Colgrove | G06F 3/0608 711/111 |
| 8,392,370 B1 | 3/2013 | Whitney et al. | |
| 8,656,386 B1 | 2/2014 | Baimetov et al. | |

(Continued)

FOREIGN PATENT DOCUMENTS

WO    2017105400 A1    6/2017

OTHER PUBLICATIONS

International Patent Application No. PCT/US2019/021284—International Search Report and Written Opinion dated Jun. 21, 2019.

*Primary Examiner* — Wilson Lee

(74) *Attorney, Agent, or Firm* — Dickinson Wright RLLP

(57) ABSTRACT

This application relates to a client-server architecture that enables file sharing between an instructor and a class. The files are stored in a storage service accessible via a network, and a separate copy of each file can be shared with each student in the class. In order to facilitate the sharing of multiple copies of the file, a share pool is created in a partition of the storage service allocated to the instructor. The share pool includes a number of stub files that are placeholders for clones of the shared file. A share handler service receives a request to share a file with a class, requests a number of stub files from the share pool, and utilizes the number of stub files to generate clones of the shared file in the partition of the storage service. Students are then granted access to the clones in the partition.

20 Claims, 17 Drawing Sheets

(56) References Cited

U.S. PATENT DOCUMENTS

| | | | |
|---|---|---|---|
| 8,756,598 B1 | 6/2014 | Costea et al. | |
| 9,152,628 B1* | 10/2015 | Stacey | G06F 16/1744 |
| 9,323,758 B1* | 4/2016 | Stacey | G06F 16/113 |
| 9,817,840 B1* | 11/2017 | Emelyanov | G06F 16/172 |
| 10,120,746 B1* | 11/2018 | Sharifi Mehr | H04L 63/1425 |
| 10,416,919 B1* | 9/2019 | Cai | G06F 3/0611 |
| 2002/0103776 A1* | 8/2002 | Bella | G06K 9/6217 |
| | | | 706/49 |
| 2003/0008269 A1 | 1/2003 | Helmick et al. | |
| 2009/0150460 A1* | 6/2009 | McClanahan | G06F 16/119 |
| 2009/0249005 A1* | 10/2009 | Bender | G06F 11/1458 |
| | | | 711/E12.001 |
| 2012/0066179 A1* | 3/2012 | Saika | G06F 3/061 |
| | | | 707/634 |
| 2012/0151250 A1* | 6/2012 | Saika | G06F 11/1469 |
| | | | 714/E11.073 |
| 2012/0159232 A1* | 6/2012 | Shimada | G06F 16/183 |
| | | | 714/E11.006 |
| 2012/0191671 A1* | 7/2012 | Kitamura | G06F 16/1748 |
| | | | 707/692 |
| 2012/0254555 A1* | 10/2012 | Miwa | G06F 3/067 |
| | | | 711/154 |
| 2013/0117140 A1* | 5/2013 | Kashanian | H04L 67/02 |
| | | | 705/26.1 |
| 2013/0191350 A1* | 7/2013 | Esaka | G06F 16/1748 |
| | | | 707/E17.005 |
| 2014/0149347 A1* | 5/2014 | Ben-Shaul | G06F 9/451 |
| | | | 707/623 |
| 2014/0149476 A1 | 5/2014 | Kishimoto et al. | |
| 2015/0227384 A1* | 8/2015 | Zamir | G06F 9/45558 |
| | | | 718/1 |
| 2015/0293699 A1* | 10/2015 | Bromley | G06F 3/0649 |
| | | | 711/161 |
| 2015/0356078 A1* | 12/2015 | Kishimoto | G06F 16/119 |
| | | | 707/610 |
| 2015/0381671 A1 | 12/2015 | Lee et al. | |
| 2016/0292040 A1 | 10/2016 | Kumarasamy | |
| 2016/0314291 A1* | 10/2016 | de Luna | G06F 21/34 |
| 2017/0212794 A1 | 7/2017 | Fadel et al. | |
| 2018/0131764 A1* | 5/2018 | Suter | G06F 9/4856 |
| 2018/0336367 A1* | 11/2018 | Jabbouri | G06F 21/6245 |
| 2019/0238618 A1* | 8/2019 | Bono | G06F 9/547 |

* cited by examiner

SHARE POOLS FOR SHARING FILES VIA A STORAGE SERVICE

CROSS-REFERENCE TO RELATED APPLICATIONS

The present application claims the benefit of U.S. Provisional Application No. 62/648,364 entitled "SHARE POOLS FOR SHARING FILES VIA A STORAGE SERVICE," filed Mar. 26, 2018, the content of which is incorporated herein by reference in its entirety for all purposes.

FIELD

The described embodiments relate generally to a software framework configured to implement various techniques in a classroom setting. More particularly, the present embodiments relate to sharing documents between instructors and students in a classroom setting.

BACKGROUND

Ever since the invention of audio visual (AV) devices such as televisions, projection systems, and tape decks, school districts and instructors have been incorporating materials into their lesson plans that utilize these devices to provide information to students in new and engaging ways. Instructors were not merely limited to textbooks, lectures, and written assignments. With the advent of the information age, the Internet has opened new horizons in the classroom. Instructors can now draw from a nearly unlimited resource of information in order to create interactive lesson plans that are engaging and productive.

However, the tools available to instructors when developing these lesson plans are limited. For example, a Wikipedia® article may provide useful background material on a particular subject. Nevertheless, the instructor may not have a good option to share the article with their students. The instructor could print out the article on paper hand-outs, which was the traditional way to distribute such materials to students. However, this method is wasteful and loses some of the interactive elements (e.g., animations, hyperlinks, etc.) of the article as presented online. Alternatively, the instructor could email a hyperlink for the article to each of their students to view on a computing device at home or provided by the school. While such methods allow the students to view the article within the proper context to interact with the interactive elements embedded within the article, there is no way for the instructor to track whether each student clicked on the hyperlink or even whether each student actually read through the entire article.

SUMMARY

This paper describes various embodiments that relate to a client-server architecture that enables the sharing of documents between an instructor and students. A hand-out can include attachments that specify placeholders for hand-ins and/or activities to be performed by the student as part of the assignment. The hand-out can specify documents that an instructor shares with the students in a class. A set of services facilitates the sharing of the documents between different client devices.

In some embodiments, a share pool is generated in a partition of a storage service accessible via a network. The share pool includes stub files created as placeholders to create clones of a file to be shared via the storage service. In response to a request to generate a number of clones of a shared file, a number of stub files can be removed from the share pool. The stub files can be moved to a different location within the storage service, a file name for the stub files can be changed, and data from a shared file can be copied into the stub files. The clones of the shared file are then shared with a number of users of the storage service.

In some embodiments, each stub file is a copy of a seed file that does not include any content related to the shared file. The stub file is a placeholder within the hierarchy of directories or folders within a file system. In some embodiments, the partition of the storage service is allocated to an instructor for a class. Each clone of the shared file is associated with an identifier for a particular student enrolled in the class.

In some embodiments, the share pool is replenished with a number of additional stub files in response to the number of stub files being removed from the share pool. The replenishing can be managed by a pool service executed by a server device.

In some embodiments, creating the number of clones of the file from the number of stub files includes, for each stub file in the number of stub files: moving the stub file from a first location in the partition of the storage service to a second location in the partition of the storage service, changing the file name for the stub file, and copying content related to the file into the stub file to create the clone of the file from the stub file. The first location can be a hidden folder in the partition and the second location can be a folder associated with a hand-out for a class.

In some embodiment, the storage service implements a document application programming interface for performing file operations on files in the partition of the storage service. The storage service can also implement a share application programming interface for granting access to the files in the partition of the storage service to other users of the storage service.

In some embodiments, at least one non-transitory computer readable storage medium is disclosed that is configured to store instructions. The instructions, in response to being executed by at least one processor included in a server device, cause the server device to share files with a plurality of users. The server device generates a share pool including one or more stub files stored in a storage service; receives a request to generate a number of clones of a shared file stored in the storage service; allocates a number of stub files from the share pool to create clones of the shared file; and provides, through the storage service, access to the clones of the shared file to the plurality of users.

In some embodiments, the storage service is divided into a number of partitions having different scope. The share pool is stored in a first partition having a scope associated with an instructor for a class, and each clone of the shared file is associated with an identifier for a student enrolled in the class.

In some embodiments, the share pool is replenished with a number of additional stub files to ensure that the number of stub files in the share pool is greater than a pre-defined threshold value. In some embodiments, the pre-defined threshold value is based on a multiple of an average number of students enrolled in classes offered by a school district.

In some embodiments, a system is disclosed for sharing files among a plurality of users. The system includes a storage service implemented by one or more server devices and one or more services configured to: manage a share pool associated with a user of the storage service, allocate stub files in the share pool to create a number of clones of a shared file, and associate a number of additional users of the storage service with the number of clones of the shared file. The share pool includes one or more stub files stored in a partition of the storage service allocated to the user. Each clone of the shared file being associated with a particular additional user of the number of additional users.

In some embodiments, the one or more services include a share handler service, a pool service, and a sharing service. The share handler service is configured to receive requests to share files with a class and request a number of stub files from the share pool. The pool service is configured to create share pools in partitions of the storage service. The sharing service is configured to generate clones of files in a particular partition of the storage service and grant access to the clones to additional users. The share handler service is configured to call the pool service to request the number of stub files from the share pool. In some embodiments, the one or more services are included in at least two server devices connected over a network.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
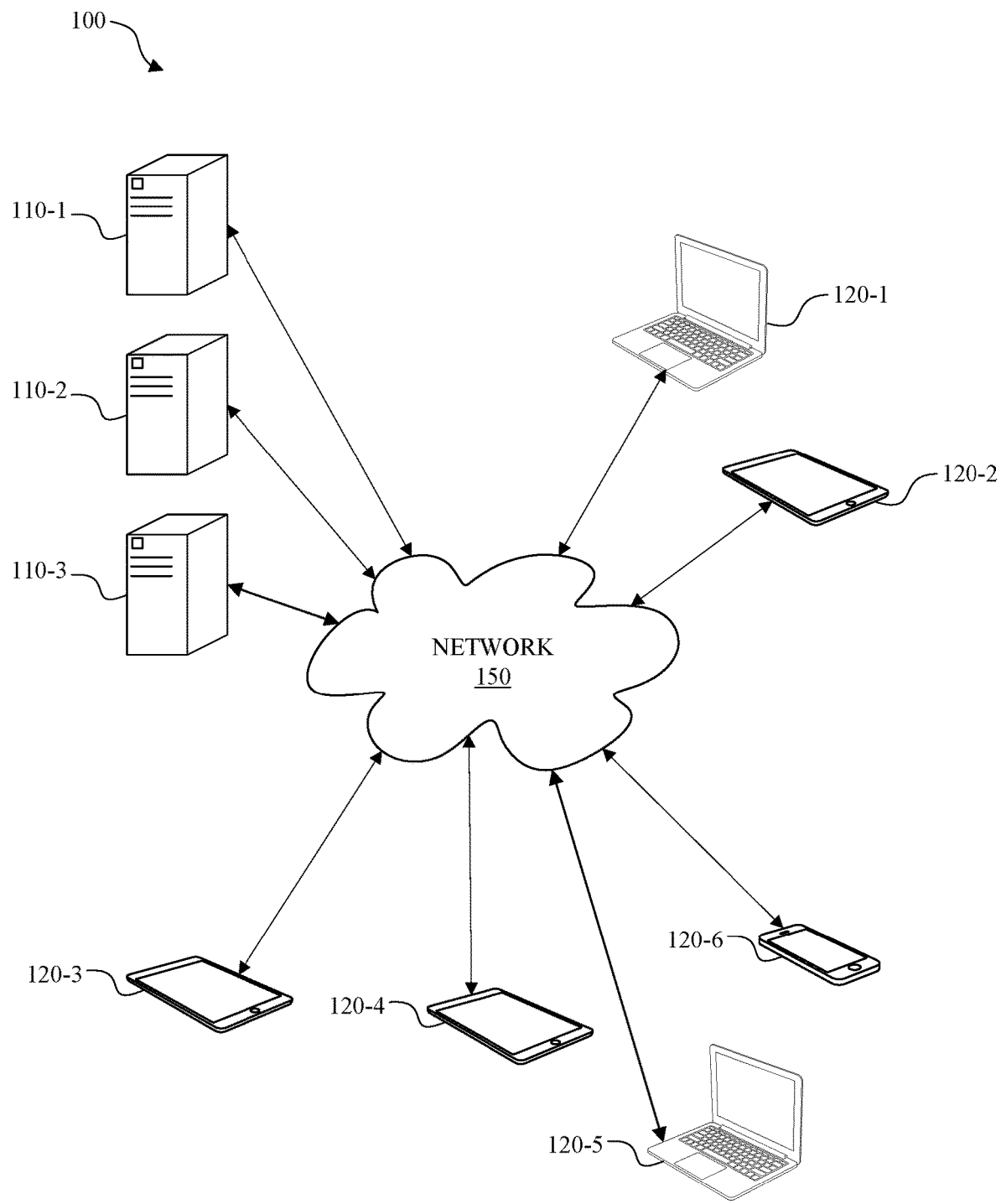
FIG. 1 illustrates a network environment designed to operate within a classroom setting, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The digital classroom provides students with new opportunities to learn within a rich environment of interactive applications installed on computing devices provided to the students. While devices can allow students to interact with information online that is accessed through a browser or provided through specialized applications, the benefits to these activities are usually lost due to the difficult nature of tracking these activities. Consequently, new techniques for incorporating these materials into a unified classroom architecture is desired.

A classroom setting can provide instructors and students with a number of devices and applications that enable the instructor to assign the students activities. The instructor can create hand-outs that include attachments. The attachments can include files to be shared with the class. The instructor can store the files remotely in a storage service accessible via a network. In order to share the file with the group of students in a class, a separate copy of the file can be shared with each student in the class.

In order to facilitate the sharing of multiple copies of the file with low latency after the hand-out is published, a share pool is created in a partition of the storage service allocated to the instructor. The share pool includes a number of stub files that are placeholders for the clones of the shared file. A share handler service receives a request to share a file with a class, requests a number of stub files from the share pool, and utilizes the stub files from the share pool to generate clones of the shared file in a partition of the storage service. The group of students are then associated with the clones of the shared file within the storage service such that the students are provided access to view and/or edit the clones of the shared file. The share pool can reduce a latency from the time a hand-out is published until the time students have access to the files attached to the hand-out from minutes to seconds.

These and other embodiments are discussed below with reference to FIGS. 1-13; however, those skilled in the art will readily appreciate that the detailed description given herein with respect to these figures is for explanatory purposes only and should not be construed as limiting.

FIG. 1 illustrates a network environment 100 designed to operate within a classroom setting, in accordance with some embodiments. The network environment 100 includes a number of separate and distinct computing devices configured to communicate over a network 150. The network environment 100 includes server devices 110 and client devices 120. As shown in FIG. 1, the client devices 120 can include, but are not limited to, laptop computers 120-1 and 120-5, tablet computers 120-2, 120-3, and 120-4, and mobile devices 120-6. It will be appreciated that the network environment 100 can include other types of client devices 120 such as desktop computers, wearable devices (e.g., smart watches), personal digital assistants, and the like.

The following terms may be used throughout this paper. A class refers to a group of individuals who meet regularly to be taught a particular subject or activity. The class can include one or more instructors and a number of students enrolled in the class. A classroom setting refers to a group of related devices utilized by a group of users associated with a class. A school refers to an administrative collection of a number of classes taught by a group of instructors. A school district refers to an organization that manages one or more schools.

In some embodiments, an instructor utilizes one or more devices to disseminate materials to students within a class. As shown in FIG. 1, the instructor can utilize a laptop computer such as client device 120-1 or a tablet computer such as client device 120-2 to create materials for the students. In some embodiments, the laptop computer and/or the tablet computer include applications configured to create interactive assignments for the students. The assignments can include links to materials available over the network 150, such as hyperlinks to websites available from a first server device 110-1 or documents stored on a second server device 110-2. The applications can also enable the instructor to easily distribute the assignments to the students. The students can utilize the tablet computers such as client device 120-3 and 120-4, the laptop computer such as client device 120-5, and/or the mobile device such as client device 120-6 to access the assignments and view the materials included in each assignment.

In some embodiments, a third server device 110-3 hosts one or more services utilized by the applications included on the various client devices 120. For example, the third server device 110-3 can host a service for uploading data structures or files that define an assignment to a network-based storage resource. As another example, the third server device 110-3 can host a service that tracks which client devices 120 are registered to a particular classroom setting. As yet another example, the third server device 110-3 can host a service that tracks a progress of each student corresponding with a particular assignment. In some embodiments, services utilized by the application(s) can be hosted on more than one server device 110. In addition, the services can be hosted by different service providers. For example, a first server device 110-maintained by a first service provider can be configured to host a network-based storage service, and a second server device 110-2 maintained by a second service provider can be configured to host a school management service.

A description of a software framework for applications executed by the various client devices 120 within the classroom setting is set forth below. In addition, a description of various services utilized by the applications described herein and hosted on one or more server device 110 is set forth below.

Figure 2:
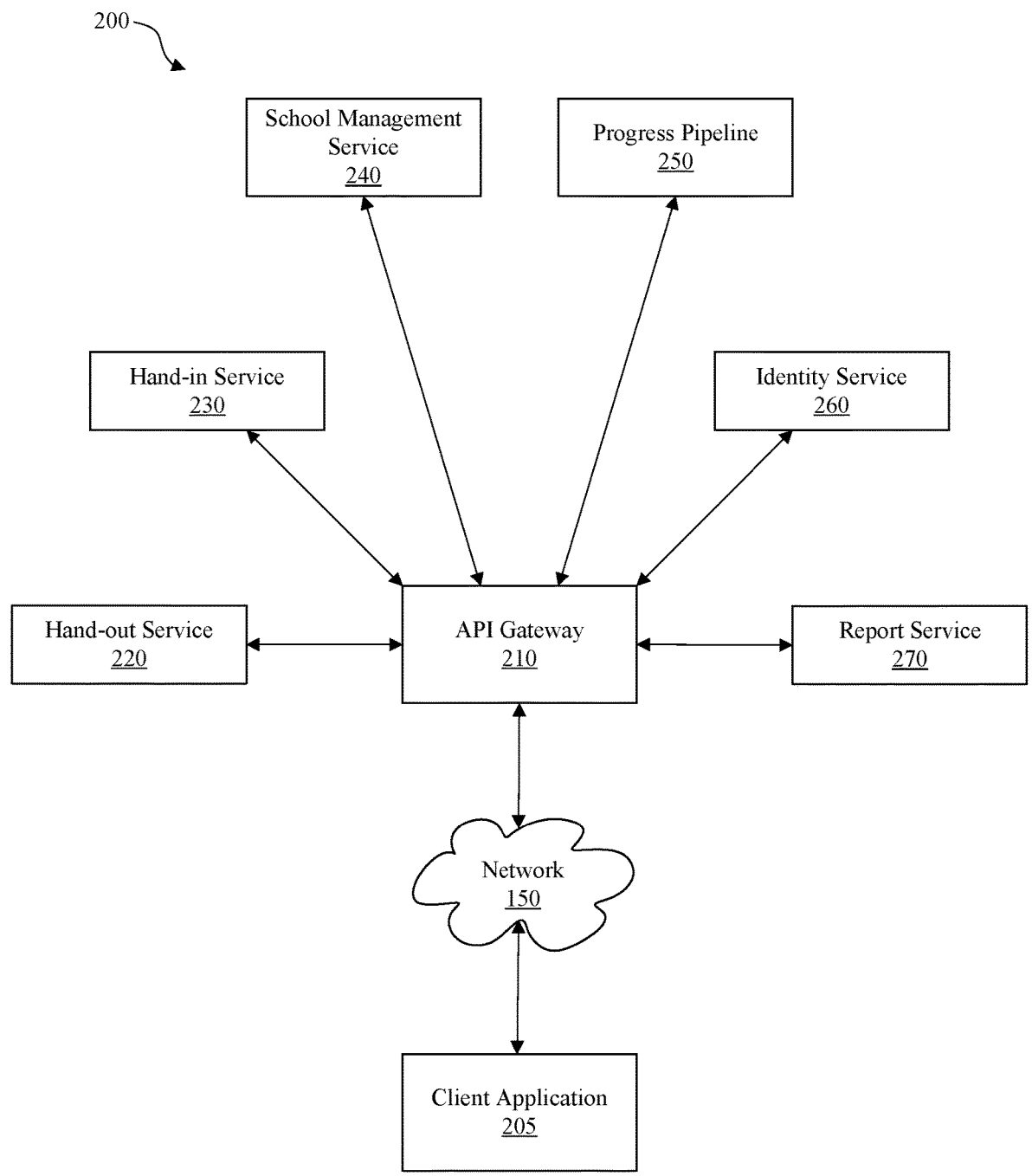
FIG. 2 illustrates a client-server architecture implemented to enable progress tracking for client devices in the classroom setting, in accordance with some embodiments.

FIG. 2 illustrates a client-server architecture 200 implemented to enable progress tracking for client devices 120 in the classroom setting, in accordance with some embodiments. The client-server architecture 200 includes a client application 205 implemented on a client device 120 and configured to interact with a number of services implemented on server devices 110 accessible over the network 150. The client-server architecture 200 enables instructors to create assignments that include rich interactive materials provided by one or more third-party applications installed on the client device 120 as well as integrate seamless tracking of progress such that an instructor can monitor the students' effort at keeping abreast of the assignments in a class.

In some embodiments, the client application 205 is a binary executable configured to be executed by a processor included in the client device 120. The binary executable can be designed to work within a particular operating environment, such as a target hardware platform designed to execute a target operating system. Consequently, the client application 205 can be implemented using multiple versions of the source code compiled for different operating environments. For example, a first version of the client application 205 can be designed for a laptop computer 120-1 and a second version of the client application 205 can be designed for a tablet computer 120-2.

In some embodiments, the client application 205 is designed to connect with one or more services over the network 150. The services can include, but are not limited to, a hand-out service 220, a hand-in service 230, a school management service 240, a progress pipeline 250, an identity service 260, and a report service 270. The client application 205 can be configured to access a service via an application programming interface (API) implemented by the service. For example, a web-based service can implement an API using a simple object access protocol (SOAP) or a representational state transfer protocol (REST) that enables the client application 205 to access and/or operate on resources associated with the service. The API can enable the client application 205 to transmit data to and/or receive data from the service. API calls can also cause the service to perform various operations and/or call additional services using additional API calls.

In other embodiments, the client application 205 is a web-based application displayed within a browser of a client device 120. The client application 205 can include a series of resources (e.g., hypertext markup language (HTML) documents, images, scripts, etc.) requested from a server associated with a website. The browser receives the resources and interprets the resources to display a representation of the website on a display of the client device 120. The client application 205 is therefore platform-independent in that the client application 205 can be displayed on a plurality of different client devices 120 running different operating systems.

In some embodiments, the client application 205 interfaces with the one or more services through an API gateway 210. The API gateway 210 is implemented by a server device 110 and redirects API calls received from client devices 120 to the various services in the client-server architecture 200. In other embodiments, the API gateway 210 is omitted or selectively bypassed and the client devices 120 transmit API calls to the services directly.

In some embodiments, the client application 205 enables an instructor to create hand-outs for a class. A hand-out refers to a file or data structure that includes information related to an assignment intended to be published to students within the class. The hand-out can include a number of fields including: a hand-out identifier, a title of the assignment, a body of the assignment that includes text-based instructions for the students on how to complete the assignment, a due date for the assignment, and a list of attachments associated with the assignment. The hand-outs can be created and stored locally on a particular client device 120. The attachments can include files (e.g., documents, images, videos, etc.), placeholders for a file the student is to turn in, and activities the student is to complete as part of the assignment. The activities are performed using third-party applications that implement a portion of a class kit software framework. Examples of activities can include, but are not limited to, reading a chapter of a digital book or textbook, taking a quiz or answering a set of problems, tracking time spent performing a task such as playing an interactive game or performing a digital experiment, and so forth.

In some embodiments, the client-server architecture 200 includes a hand-out service 220. The hand-out service 220 is configured to manage hand-outs. In some embodiments, the hand-out service 220 is configured to sync hand-outs created on one client device 120 with another client device 120 to enable an instructor to work on multiple devices. In some embodiments, the hand-out service 220 is configured to enable the hand-outs to be published to a list of students. Publishing a hand-out refers to making the information in the hand-out available to be viewed by the students on a separate client device 120 as well as handling various back-end operations related to the attachments for the hand-outs.

In some embodiments, the client-server architecture 200 can also include a hand-in service 230. A hand-in refers to a placeholder for a file or data structure, which indicates that a student is instructed to create a file or data structure to turn in in order to complete the assignment. A student can create the file or data structure and submit the file or data structure to the hand-in service 230 to satisfy the requirement for completing the assignment.

In some embodiments, the client-server architecture 200 can also include a school management service 240 configured to manage administrative information for a school district related to the structure of classes. For example, the school management service 240 can maintain records that indicate which instructors are assigned to each of a plurality of classes. The records can also indicate which students are enrolled in each of the plurality of classes. Each instructor or student can be assigned an instructor identifier or a student identifier, respectively. Each class created by the school district can be associated with a class identifier. A separate record can then be created for each class identifier that lists a roster of student identifiers for students enrolled in the class. In some embodiments, a relational database associates instructor identifiers and/or student identifiers with class identifiers in one or more tables. The relational database can be queried using Structured Query Language (SQL) or some other type of query language to return information that identifies the structure of various classes.

In some embodiments, the school management service 240 includes an administrative interface that enables an administrator for a school district to create classes and specify the students enrolled in the class. The administrative interface can be, e.g., a web-based interface requiring the administrator to provide credentials in order to change the rosters for each class. In other embodiments, the school management service 240 includes an interface to download data from a separate and distinct school information system that the school district maintains separately from the client-server architecture 200. The classes and rosters can be automatically downloaded from the school information system.

In some embodiments, the client-server architecture 200 can also include a progress pipeline 250. The progress pipeline 250 provides a secure architecture for managing information related to progress tracking as students complete the assignments described in the hand-outs published by the instructors. The client devices 120 of the students can include a background process (i.e., a daemon) configured to monitor activities related to one or more third-party applications installed on the client devices 120. The daemon tracks progress made by the students in completing the assignments specified in one or more published hand-outs and transmits information related to the progress of each student to the progress pipeline 250. The progress pipeline 250 aggregates and stores the progress information to enable the instructor to view comprehensive reports for one or more students in a class.

In some embodiments, the progress pipeline 250 is implemented as a number of separate services executing on different server devices 110 and structured to process progress information in a dataflow in a pipelined manner. In other embodiments, the progress pipeline 250 can be implemented with a number of services executing on a single server device 110.

In some embodiments, the client-server architecture 200 can also include an identity service 260. The identity service 260 enables data related to particular client devices 120 to be associated with particular people (e.g., instructors or students) within the classroom setting. In some embodiments, the identity service 260 associates various user identifiers or device identifiers with a directory service identifier limited in scope to the server-side of the client-server architecture 200. The use of the identity service 260 protects the integrity of data by disassociating personally identifying information collected by the daemon from any identifiers that are utilized outside of a specific scope (e.g., the classroom setting). Thus, data like how a user scores on tests cannot be tied to other information outside of said scope like what kind of music a student likes to listen to on a music-sharing service offered by the same service provider. The integrity of such personally identifying information can be particularly important given that most students are minors and there may be special considerations taken into account when protecting the data of vulnerable users of a certain age.

In some embodiments, the client-server architecture 200 can also include a report service 270 that enables aggregated data related to the progress of activities completed by a number of students to be compiled and provided to a client device 120 to be reviewed by an instructor. The report service 270 can also analyze the progress information received from a plurality of students in order to generate statistical data related to the progress information. For example, the report service 270 can generate statistics related to how many students have completed a particular activity. The report service 270 can also track results related to activities (e.g., number of correctly answered questions from a quiz activity, a time to complete the quiz, etc.). In other embodiments, the client application 205 receives report data on individual students from the report service 270, and the client application 205 aggregates the report data and/or calculates the statistics for the class.

It will be appreciated that the client application 205 can be configured to interact with some or all of the described services in the client-server architecture 200. For example, the client application 205 can be configured to generate calls to the hand-out service 220, the hand-in service 230, the progress pipeline 250, and the report service 270. In some embodiments, the client application 205 is not configured to interact with a subset of the services, such as the school management service 240 and/or the identity service 260. Instead, other services can generate calls to these services in response to receiving a call from the client application 205.

Figure 3:
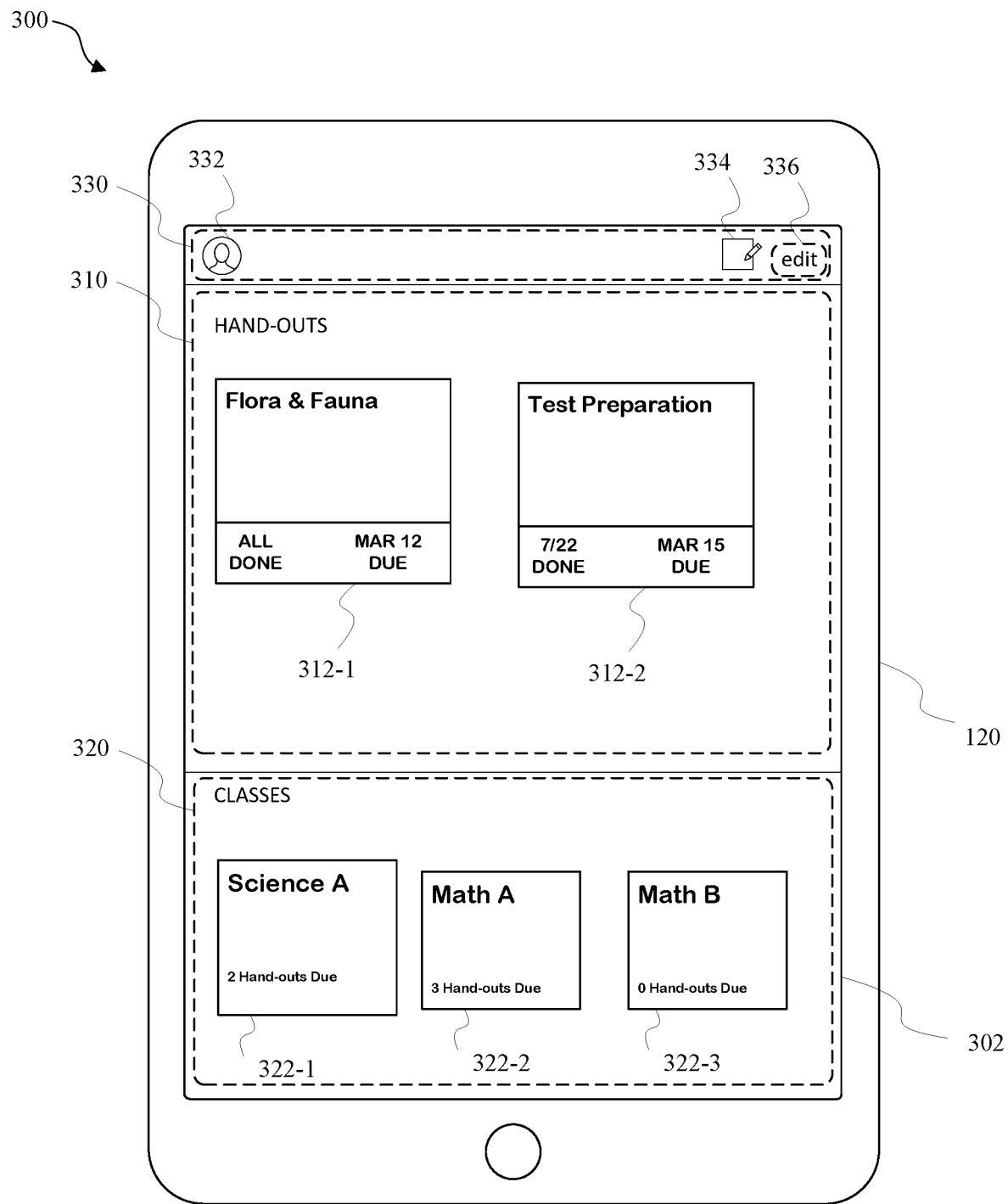
FIG. 3 illustrates a graphical user interface of the client application, in accordance with some embodiments.

FIG. 3 illustrates a GUI 300 of the client application 205, in accordance with some embodiments. The GUI 300 can be presented to an instructor on a display 302 of the client device 120. As shown in FIG. 3, the GUI 300 is displayed on a tablet computer, such as client device 120-2. The GUI 300 can include a number of elements including graphics, text, icons, shapes, input fields, output fields, display regions, etc.

In some embodiments, the GUI 300 includes a first display region 310, a second display region 320, and a third display region 330. The first display region 310 is utilized to display representations of a hand-out previously created by an instructor for a particular class. The second display region 320 is utilized to display representations of classes associated with a particular instructor. As shown in FIG. 3, the first display region 310 occupies a first portion of the pixels included in the display 302, and the second display region 320 occupies a second portion of the pixels included in the display 302.

The first display region 310 includes a header that indicates elements 312 represent separate and distinct hand-outs associated with a user account for a particular instructor. In some embodiments, each element 312 is defined by a box that includes a title of the hand-out, a descriptor for a due date associated with the hand-out, and an indication of how many students have completed the hand-out. For example, a first element 312-1 is associated with a first hand-out for a "Flora & Fauna" assignment, which has a due date of March 12 and has been completed by all of the students; and a second element 312-2 is associated with a second hand-out for a "Test Preparation" assignment, which has a due date of March 15 and has only been completed by seven out of twenty-two students assigned the hand-out. It will be appreciated that, in other embodiments, the elements 312 can take different forms. For example, the elements 312 can omit the due date and/or completion indicator. Alternately, the elements 312 can include information in addition to or in lieu of the due date and/or the completion indicator. Additionally, the elements 312 can include graphics such as an image or icons representing different activities assigned in the hand-out. In some cases, the graphics can be animated, such as, by playing a video or showing a slide show of images attached to the hand-out as a background of the element 312.

The second display region 320 includes a header that indicates elements 322 represent separate and distinct classes associated with a user account for a particular instructor. In some embodiments, each element 322 is defined by a box that includes a title of the class and a descriptor for a number of hand-outs assigned to the class. For example, a first element 322-1 is associated with a "Science A" class, which has two hand-outs assigned; a second element 322-2 is associated with a "Math A" class, which has three hand-outs assigned; and a third element 322-3 is associated with a "Math B" class, which has zero hand-outs assigned. It will be appreciated that, in other embodiments, the elements 322 can take different forms. For example, the elements 322 can omit an indicator for the number of hand-outs assigned to a class. Alternately, the elements 322 can include information in addition to or in lieu of the title of the class and the indicator for the number of hand-outs assigned to the class. For example, the elements 322 can include a number of students enrolled in the class. Additionally, the elements 322 can include graphics such as an image or a background color coded to indicate a particular subject or department related to the class.

In some embodiments, an instructor can select a particular class using an input interface of the client device 120. For example, an instructor can use a touch interface to select an element 322 associated with one of the available classes associated with the instructor. Upon selection of a particular element 322, the selected element 322 is activated and the elements 312 in the first display region 310 may be updated to reflect the hand-outs associated with the class represented by the selected element 322 in the second display region 320. A selected element 322 (e.g., the currently activated element) can be highlighted to indicate the element 322 is active. Highlighting can be implemented by increasing the size of the element, changing a color associated with the element 322 or changing the color or weight of a border of the element 322, displaying a box around the selected element 322, and so forth. As shown in FIG. 3, the first element 322-1 is activated and shown as larger than the second element 322-2 and the third element 322-3.

It will be appreciated that, in some embodiments, there may be insufficient room within the first display region 310 and/or the second display region 320 to present all of the classes and/or all of the hand-outs assigned for a particular class within the extents of the display 302. In such cases, the user of the client device 120 can use input commands, such as touch gestures, to display additional elements. For example, an icon can be displayed that indicates some elements are not displayed. The additional elements will be displayed in the first display region 310 or the second display region 320 responsive to a user selecting the icon. In another example, a user can use a swipe touch gesture to scroll horizontally to display additional elements while other elements are moved within or removed from the particular display region.

A third display region 330 is located proximate a top edge of the display 302. The third display region 330 includes elements that enable a user of the client application 205 to sign-in to a user account, generate new handouts for a particular class, or edit previously generated hand-outs stored locally on the client device 120 and/or remotely on a server device 110. In some embodiments, the third display region 330 is hidden and can be displayed responsive to a user input, such as by using a vertical swipe touch gesture to cause the third display region 330 to be unhidden.

A first icon 332 is displayed proximate a left side of the third display region 330. The first icon 332, when selected by a user, can cause the client application 205 to prompt a user to enter credentials to sign-in to a user account associated with an instructor. In some embodiments, the first display region 310 and the second display region 320 are hidden until a user signs into a particular user account using the first icon 332. In some embodiments, upon launch of the client application 205, a separate interface is displayed to the user that prompts the user to enter credentials to sign-in to a user account. The GUI 300 is only displayed on the display 302 once the user has successfully signed into a particular user account. The first icon 332 can then be used to sign-out of the user account and/or to sign-in to a different user account.

A second icon 334 is displayed proximate a right side of the third display region 330. The second icon 334, when selected by a user, can cause the client application 205 to generate a file or data structure in a file system of the client device 120 in order to store information related to a new hand-out. In some embodiments, the new file or data structure is automatically associated with the active class selected in the second display region 320. The instructor can then add information to the file or data structure using a different GUI, which is described in more detail below with reference to FIGS. 6A-6E.

A third icon 336 is displayed proximate the right side of the third display region 330. The third icon 336, when selected by a user, can cause the client application 205 to retrieve information stored in a file or data structure for a previously-generated hand-out. In some embodiments, one of the elements 312 in the first display region 310 is activated, either automatically based on selection criteria or manually responsive to input provided by a user. For example, an element 312 can be selected automatically to be activated based on a smallest difference between the current date and a due date for a hand-out of all hand-outs stored for a particular class when the element 322 that represents the class is activated. Alternately, an element 312 can be selected manually to be activated in response to a touch gesture input (e.g., a tap input) in an area of the display 302 that corresponds to the particular element 312. Although not shown explicitly in FIG. 3, a selected element 312 within the first display region 310 (e.g., the currently activated element) can be highlighted to indicate the selected element 312 is active. Responsive to selecting the third icon 336, the different GUI, which is described in more detail below with reference to FIGS. 6A-6E, can be displayed by the client device 120 and populated with data from the file or data structure associated with the active element 312.

In some embodiments, the first display region 310 includes representations for hand-outs that are being prepared as well as hand-outs that have been published to a list of students. In some cases, the elements 312 can include an indication of whether the hand-out represented by the element 312 has been published or has yet to be published (i.e., is still being prepared by the instructor).

It will be appreciated that the GUI 300 described above and shown in FIG. 3 is merely an exemplary embodiment of a GUI designed for the client application 205. In other embodiments, the GUI for the client application 205 can take other forms. The look and feel of the GUI may also correspond to standard display elements associated with a particular operating system or target environment. Furthermore, in yet other embodiments, the client application 205 is a web-based application displayed in a browser of the client device 120. In such embodiments, the GUI 300 can include a plurality of Hypertext Markup Language (HTML) elements included in one or more HTML documents. The representation of such elements can depend on the implementation of the browser application in the client device 120 and, in some cases, user preferences associated with the browser application.

Figure 4:
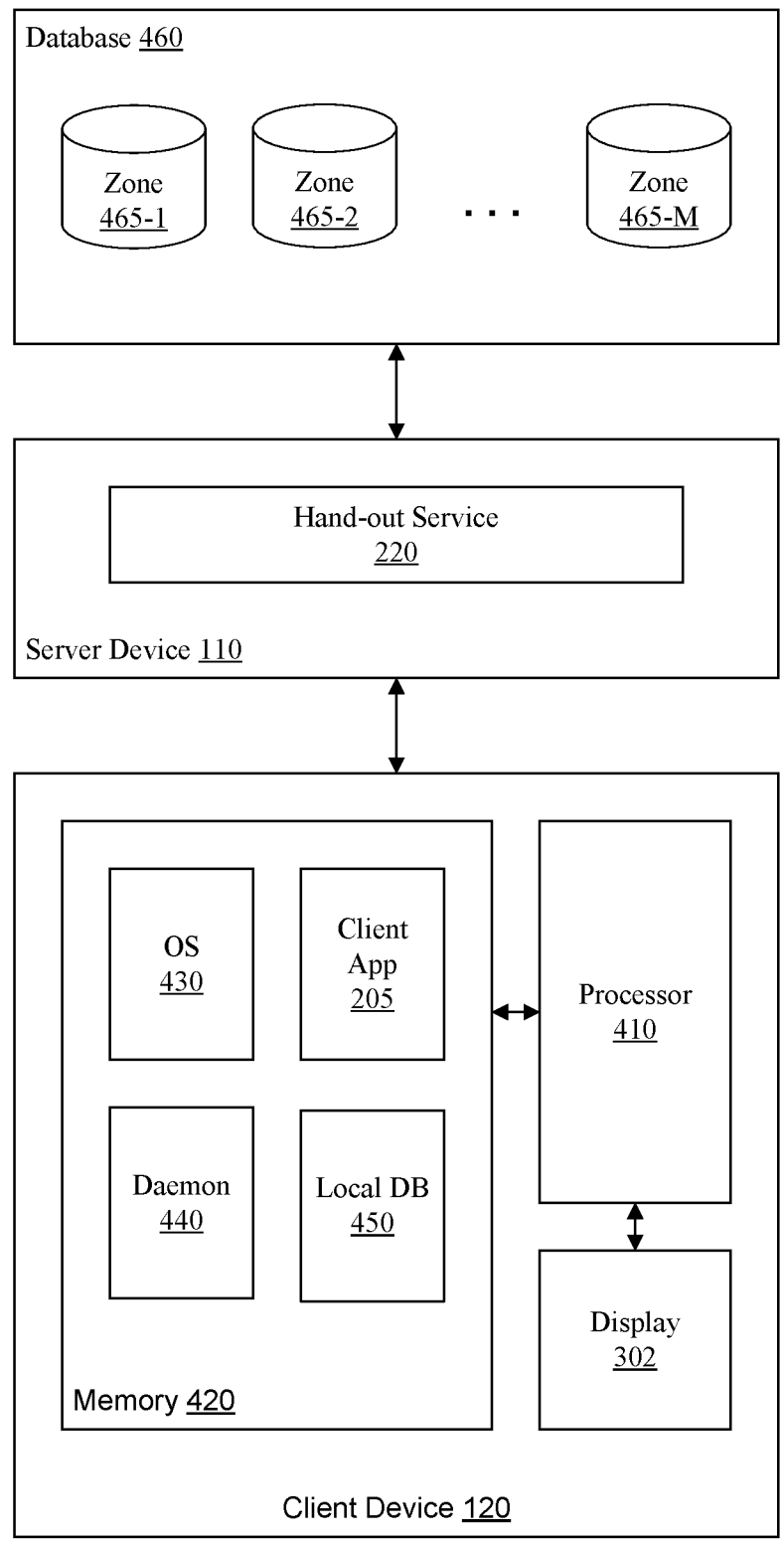
FIG. 4 illustrates a client-server relationship between the hand-out service and a client application and/or daemon, in accordance with some embodiments.

FIG. 4 illustrates a client-server relationship between the hand-out service 220 and a client application 205 and/or daemon 440, in accordance with some embodiments. The hand-out service 220 provides a means for an instructor to create and assign hand-outs to a list of students enrolled in a class associated with the instructor. As described above, the client application 205 is configured to prompt a user to provide credentials associated with a user account. If the user account is associated with an instructor, then the client application 205 enables the instructor to generate files or data structures for hand-outs within the memory 420 of the client device 120. In some embodiments, these files or data structures can be synced to a network-based storage service, which enables the instructor to access the information related to the hand-out from multiple client devices 120.

As shown in FIG. 4, a client device 120 includes a processor 410, a display 302, and a memory 420. The memory 420 includes an operating system 430, the client application 205, a daemon 440, and a local database 450. The daemon 440 is a background process that implements an API that enables the client application 205 to communicate asynchronously with the daemon 440 to perform certain tasks. One of those tasks operates to create a file in the local database 450.

In some embodiments, the daemon 440 maintains a local database 450. In some embodiments, an instructor can create a new file or data structure for a hand-out using the client application 205. The client application 205 requests the daemon 440 to create a file or data structure for the hand-out in the local database 450 maintained by the daemon 440. The instructor can populate the file or data structure for the hand-out using the GUI 600, discussed in more detail below with reference to FIGS. 6A-6E.

In some embodiments, the daemon 440 is configured to sync files or data structures in the local database 450 to a remote database 460. The remote database 460 can be a distributed database, such as a cloud-based database service, implemented on a number of server devices 110. The daemon 440 interfaces with the remote database 460 in order to sync the files or data structures in the local database 450 with remote versions of the files or data structures such that the files or data structures can be accessed and/or modified using multiple client devices 120. The syncing mechanism will be described in more detail below with reference to FIG. 5.

Once a hand-out has been synced to the remote database 460, the instructor can then switch to a different client device 120, using a different version of the client application 205, and access the version of the hand-out stored on the remote server 110 using the new client device 120. Any changes to a local copy of the resource stored on the new client device 120 will be synced to the remote database 460 to update the version of the hand-out on the remote database. These changes are then pushed to the client application 205 on the previous client device 120 to update a copy of the local resource in the local database 450 on the initial client device 120.

For example, an instructor can open a client application 205 on a laptop computer 120-1 and create a local version of a hand-out stored in a memory of the laptop computer 120-1. The daemon 440 on the laptop computer 120-1 transmits a copy of the local version of the hand-out to the remote database 460 to sync the hand-out with a version of the hand-out stored in the remote database 460. The instructor then opens a separate client application 205 on a tablet computer 120-2 and provides credentials for the instructor's user account. Opening the client application 205 on the tablet computer 120-2 causes the daemon 440 to download the remote version of the handout stored on the remote database 460 to a memory of the tablet computer 120-2, where the client application 205 on the tablet computer 120-2 can access the local copy of the hand-out and modify the local copy of the hand-out in the memory of the tablet computer 120-2. Any modifications to the local copy of the hand-out can be synced back to the remote database 460 such that the version of the hand-out stored on the remote database 460 is up to date. The next time the instructor opens the client application 205 on the laptop computer 120-1, the client application 205 will cause the daemon 440 to request a current version of the hand-out from the remote database 460, which transmits the version of the hand-out stored on the remote database 460 to the daemon 440 in the laptop computer 120-1 to store in the memory of the laptop computer 120-1 as the local version of the hand-out.

In some embodiments, the hand-out service 220 is implemented as a set of instructions, stored in a memory of a server device 110, which is configured to be executed by a processor of the server device 110. The hand-out service 220 manages distribution of hand-outs between client devices 120 associated with instructors and students. In some embodiments, the hand-out service 220 implements the distribution of hand-outs using the remote database 460. The hand-out service 220 creates zones 465 in the remote database 460. Each zone 465 is scoped to a particular class. Alternately, each zone 465 is scoped to a group of students. Each class associated with the instructor can be associated with a different group of students.

The instructor can create hand-outs in the local database 450 of a client device. The hand-outs are synced to a personal zone 465-1 for the instructor in the remote database 460. Once a particular hand-out is prepared and ready to be assigned to a group of students, the instructor can publish the hand-out utilizing the client application 205 to assign the hand-out to the group of students. The client application 205 requests the hand-out service 220 to publish the hand-out. The hand-out service 220 then causes a copy of the hand-out to be copied to a new zone 465-2 in the remote database 460 scoped to the group of students specified in the hand-out. Each of the students within the scope of the new zone 465-2 is subscribed to the new zone 465-2 such that a daemon 440 in a client device 120 controlled by each of the students in the group of students syncs the copy of the published hand-out to a local memory of the client device 120 for the student.

It will be appreciated that the hand-out service 220 also generates hand-out identifiers that can be utilized to identify the resource for the hand-out stored in the remote database 460. In some embodiments, a hand-out identifier is generated when the hand-out is published. In other embodiments, a hand-out identifier is generated when the hand-out is created. The resource for the hand-out is then copied to the new zone 465-2 and deleted from the personal zone 465-1 for the instructor when the hand-out is published.

Figure 5:
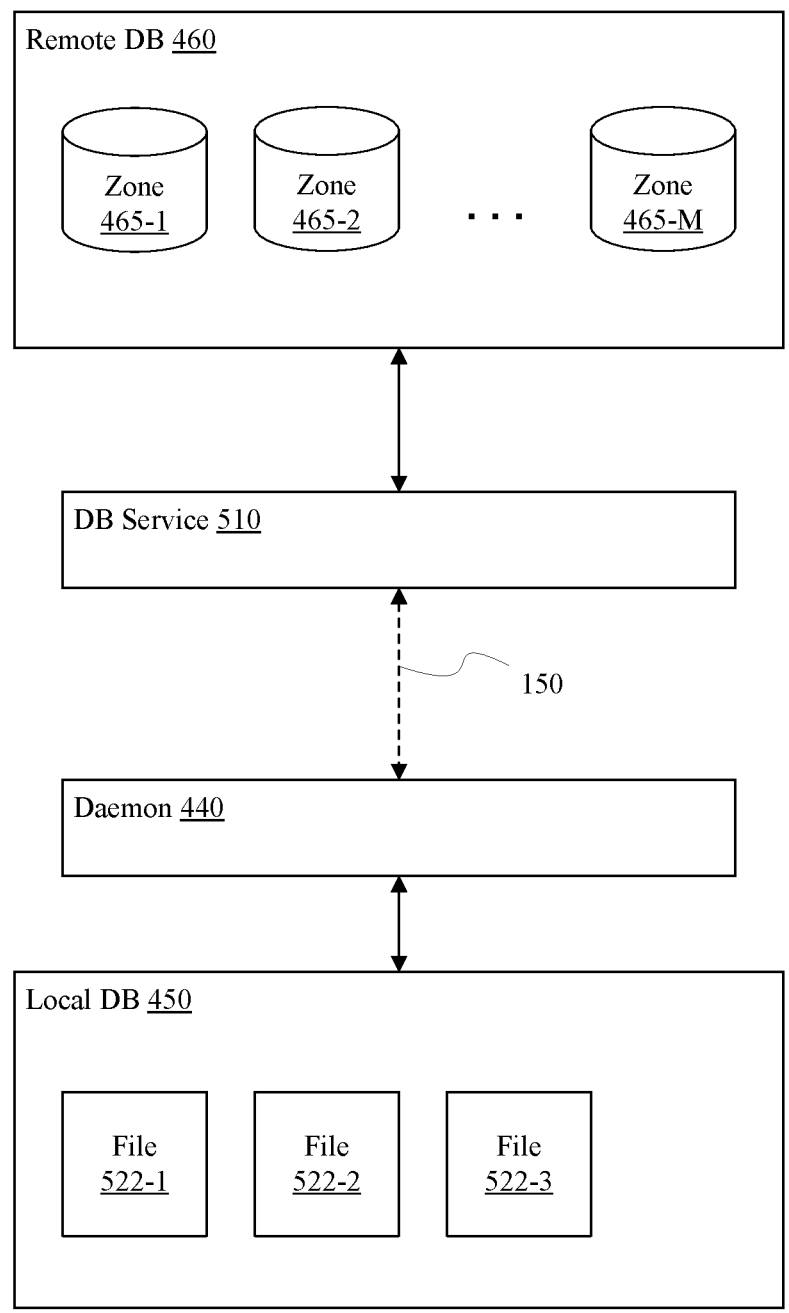
FIG. 5 illustrates a syncing mechanism implemented by the daemon, in accordance with some embodiments.

FIG. 5 illustrates a syncing mechanism implemented by the daemon 440, in accordance with some embodiments. As shown in FIG. 5, the daemon 440 is configured to interface, via a network 150, with a database service 510 that provides a front-end for the remote database 460. The database service 510 can be implemented on a server device 110. In some embodiments, the remote database 460 is restricted to the scope of a particular organization or school district. Thus, all of the information stored within a remote database 460 is for a particular school district. In such embodiments, the database service 510 is configured to manage multiple remote databases 460 for different organizations or school districts. In various embodiments, the remote database 460 is a cloud-based distributed database service managed by a service provider.

In some embodiments, the database service 510 is configured to store files in a plurality of different zones 465 implemented within the remote database 460. Each instructor and/or student in the school district can be assigned a different zone 465 as a personal zone within the remote database 460. The personal zones 465 can store files or data structures associated with a particular user account. In addition, each class created by the school district can be assigned a class zone 465 to share resources with all students and instructors associated with a class. In alternative embodiments, zones 465 can be created for groups of students and/or instructors that can be a subset of a class or enrolled in two or more classes. The class zones 465 can be utilized to publish hand-outs to students and/or other instructors associated with a particular class. Zones 465 can be scoped to an organization, a class, or an individual (e.g., an instructor or a student). Zones 465 can also be utilized for different data.

In some embodiments, the database service 510 maintains subscriptions for each zone 465 that indicate a list of users (e.g., instructors and/or students) within the scope of each zone 465. The database service 510 can push notifications to each of the client devices 120 for the users subscribed to a zone 465 whenever a resource within the zone 465 is updated. The daemon 440 on a particular client device 120 receives the notification and will download the updated resources from the zone 465 to update local copies of the resource 522 in the local database 450.

It will be appreciated that different types of zones can be created to exploit the syncing mechanism in order to implement some functionality required by one or more services in the client-server architecture 200. For example, zones can be created to store hand-outs, hand-ins, bookmarked contexts associated with third-party applications, roster information for a class, progress tracking information, etc. Furthermore, each of the zones described above can be scoped to a single user (i.e., as a personal zone) or multiple users. For example, a hand-out zone 465 is created to store data related to a hand-out (e.g., attachments, resources for hand-ins uploaded by students, etc.) and can be scoped to a group of students identified in the hand-out. A progress zone 465 is created to store progress information for a number of students. The progress zone 465 can be scoped to a class, or a particular hand-out published for a class. A roster zone 465 is created to store data related to class structure for an organization. The roster zone 465 can be scoped to the organization.

Figure 6A:
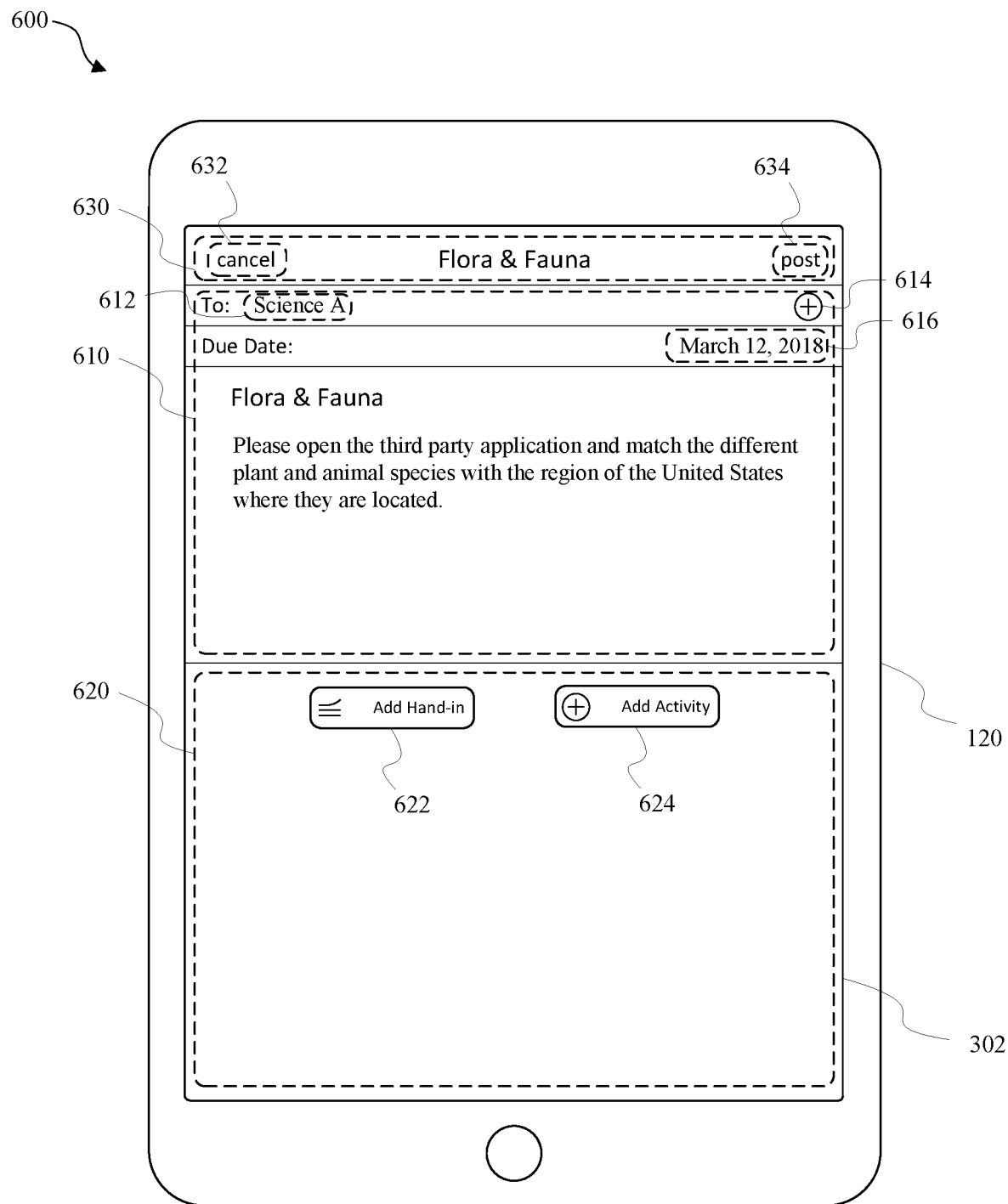
FIGS. 6A-6E illustrate a graphical user interface of the client application, in accordance with some embodiments.

FIGS. 6A-6E illustrate a GUI 600 of the client application 205, in accordance with some embodiments. The GUI 600 can be used to edit the information stored in a hand-out an instructor is preparing to assign to a class. The GUI 600 can be presented on a display 302 of the client device 120. As shown in FIG. 6A, the GUI 600 is displayed on a tablet computer such as client device 120-2. The GUI 600 can include a number of elements including graphics, text, icons, shapes, input fields, display regions, etc. In some embodiments, the GUI 600 is displayed in response to an instructor selecting the second icon 334 or the third icon 336 in the GUI 300.

The GUI 600 includes a first display region 610, a second display region 620, and a third display region 630. The first display region 610 is utilized to display information related to a hand-out created by an instructor for a particular class or group of students. The second display region 620 is utilized to display attachments to the hand-out. As shown in FIG. 6, the first display region 610 occupies a first portion of the pixels included in the display 302, and the second display region 620 occupies a second portion of the pixels included in the display 302. The third display region 630 occupies a third portion of the pixels included in the display 302. In some embodiments, the third display region 630 can be hidden, and the third display region 630 is displayed responsive to user input such as using a swipe touch gesture to cause the third display region 630 to appear proximate a top edge of the display 302.

As shown in FIG. 6A, the first display region 610 includes an interface to indicate a group of students that will be assigned the hand-out. The interface shows a label (e.g., "To:"), a user interface element 612, and a user interface element 614. An instructor can specify a group of students to be assigned the hand-out by either typing an identifier for the student(s) in the user interface element 612 or selecting the user interface element 614 and selecting the group of students from a list.

In some embodiments, selecting the user interface element 614 causes the client application 205 to request roster data for the classes associated with the instructor signed into the client application 205. The roster data includes identifiers for all students enrolled in any classes associated with the instructor. The client application 205 can request the list of identifiers from the school management service 240. Alternately, the client application 205 can retrieve the list of identifiers from a local memory 420 of the client device 120. For example, a roster service can periodically request the roster data from the school management service 240, which stores the roster data in a roster zone 465 of the remote database 460. The roster zone 465 can be scoped to a particular class and the instructor can be subscribed to the roster zones 465 for those classes associated with the instructor. Thus, through the syncing mechanism, the daemon 440 will download the roster data into the local database 450 of the client device 120, where it can be accessed by the client application 205.

The first display region 610 also includes an interface to indicate a due date for the students to complete the activities attached to the hand-out and submit any hand-ins assigned in the hand-out. The interface shows a label (e.g., "Due Date:") and a user interface element 616. The user interface element 616 can display a date (e.g., a time period) for completing the assignment. Selecting the user interface element 616 can cause a representation of a calendar to be displayed that let's an instructor select the date.

The first display region 610 also includes a number of text fields that can be edited by the instructor to change a title and a body of the hand-out. For example, as shown in FIG. 6A, the instructor has specified a title of "Flora & Fauna" for the hand-out and written a set of instructions provided to the student on how to complete the assignment.

The second display region 620 includes a pair of user interface elements referred to as a first icon 622 and a second icon 624. The first icon 622 can be selected by an instructor to add a placeholder for a hand-in to the hand-out. The second icon 624 can be selected by an instructor to add an activity to the hand-out. Any attachments to the hand-out can be listed below the first icon 622 and the second icon 624. As shown in FIG. 6A, there are no placeholders for hand-ins or activities currently attached to this hand-out.

The third display region 630 includes user interface elements referred to as a first icon 632 and a second icon 634. The first icon 632 in the third display region 630 enables a user to cancel the creation of a hand-out. The second icon 634 in the third display region 630 enables a user to post or publish a hand-out to the group of students associated with the hand-out.

Figure 6B:
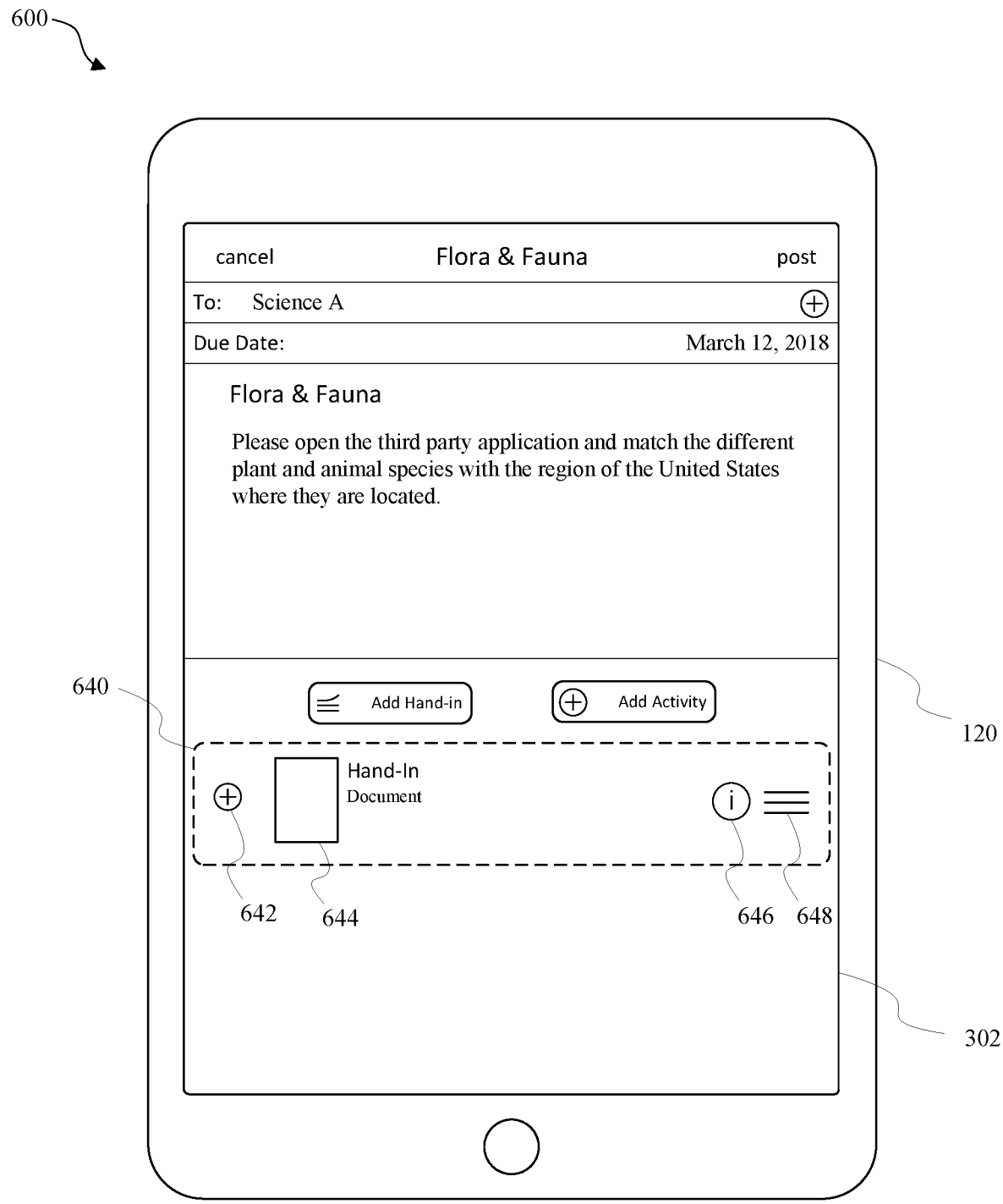

As shown in FIG. 6B, attaching a placeholder for a hand-in to the hand-out populates a box 640 of the second display region 620 with a number of user interface elements. For example, a first user interface element 642 enables the options for the hand-in to be edited, a second user interface element 644 displays information related to the hand-in, a third user interface element 646 enables a user to display more detailed information about the hand-in, and a fourth user interface element 648 enables a user to re-order the attachments to a hand-out or delete (e.g., un-attach) the placeholder for the hand-in from the hand-out. In some embodiments, the second user interface element 644 includes a thumbnail image of a representation of the resource for the hand-in and text located next to the thumbnail image that provides information related to the hand-in. For example, the text can indicate a title of the hand-in and a type of resource that will be generated for the hand-in. It will be appreciated that this information may be omitted or additional information may be included in lieu of the information described herein.

Returning to FIG. 6A, selecting the second icon 624 causes the client application 205 to display an interface that includes user interface elements that enable an instructor to attach an activity to the hand-out. The types of activities can include an activity completed with a third-party application, an activity performed by viewing or editing an attachment, an activity completed by viewing a network resource associated with a bookmark or link within a browser application, and an activity completed by viewing a multimedia file (e.g., image(s), video(s), etc.).

Figure 6C:
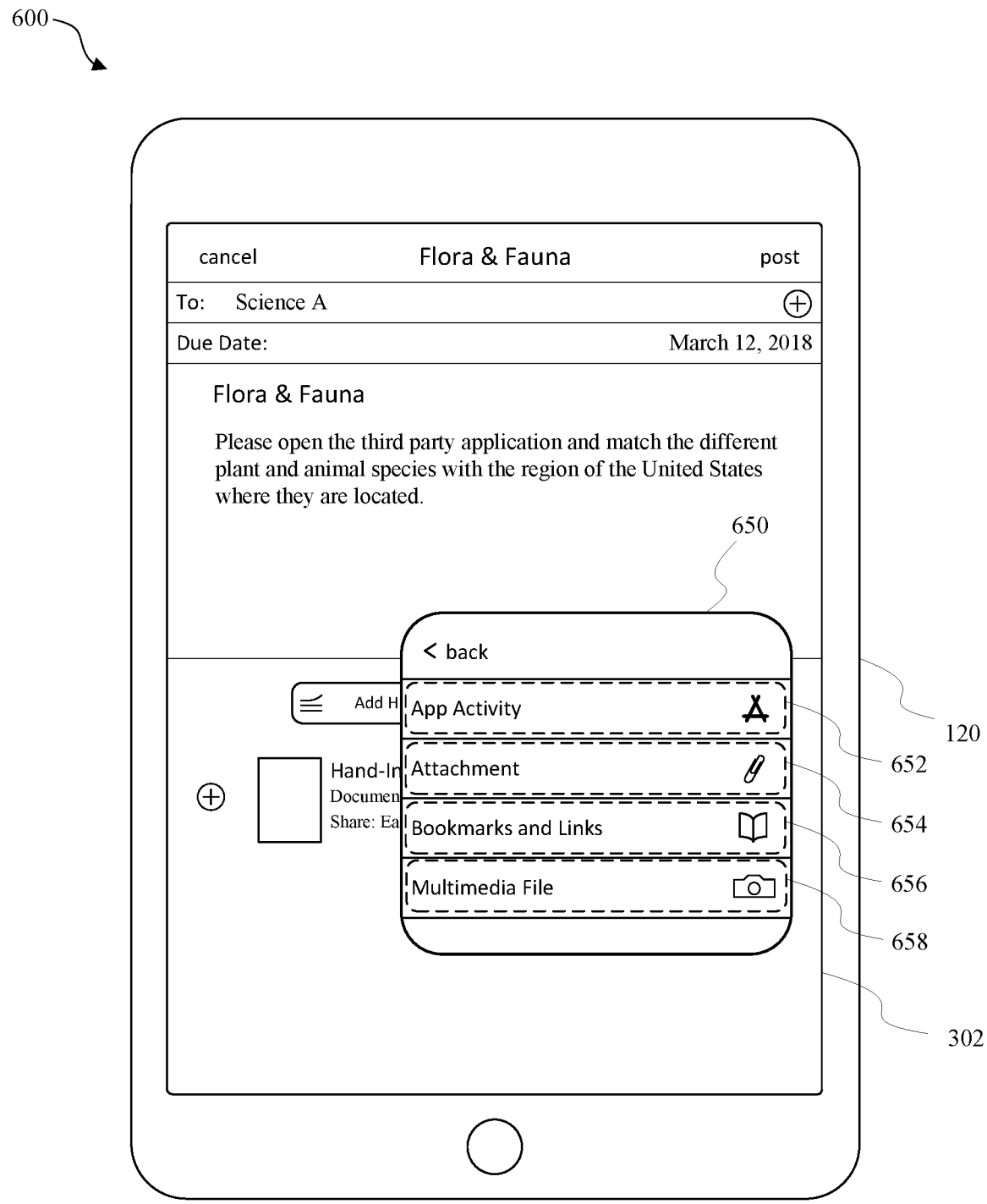

As shown in FIG. 6C, a box 650 can be displayed in response to a user selecting the second icon 624 in the GUI 600. The box 650 includes a first user interface element 652 that enables an instructor to associate an application activity with the hand-out. For example, a third-party application can be configured to present a quiz to a student and prompt the student to answer the questions included in the quiz. As another example, a third-party application could provide an interactive lesson for a student that includes the student following instructions to perform a task (e.g., writing source code for a program, playing a game, matching images with words in a foreign language, etc.). As yet another example, the third-party application could present text for a digital book or textbook to a student to read one or more sections of the book or textbook.

The box 650 includes a second user interface element 654 that enables an instructor to attach a file to the hand-out. The file can include a document, a spreadsheet, a presentation (e.g., a slide deck), source code, or any other type of file that can be viewed with an application on the client device 120. The attached file enables the instructor to distribute materials that are typically read or viewed by a student. In some embodiments, the instructor can specify whether a single file is shared among all students in the class, referred to as a collaborative option, or whether clones of a file (e.g., copies) are shared with each student individually. The instructor can also specify permissions associated with the file, rendering the attached file read-only or allowing read-write access for a student to edit the file.

The box 650 includes a third user interface element 656 that enables an instructor to attach a bookmark or link to the hand-out. A bookmark or link refers to a hyperlink that specifies a uniform resource locator (URL) for a resource accessible over a network such as the Internet. The link can enable students to view web-sites that may be pertinent to the lesson.

The box 650 includes a fourth user interface element 658 that enables an instructor to attach a multimedia file to the hand-out. A multimedia file can include a picture, a slide show, a video, or other types of multimedia such as virtual reality data or a three-dimensional model. The multimedia files can then be viewed by a student using an application installed on the client device 120, such as an image viewer application.

Figure 6D:
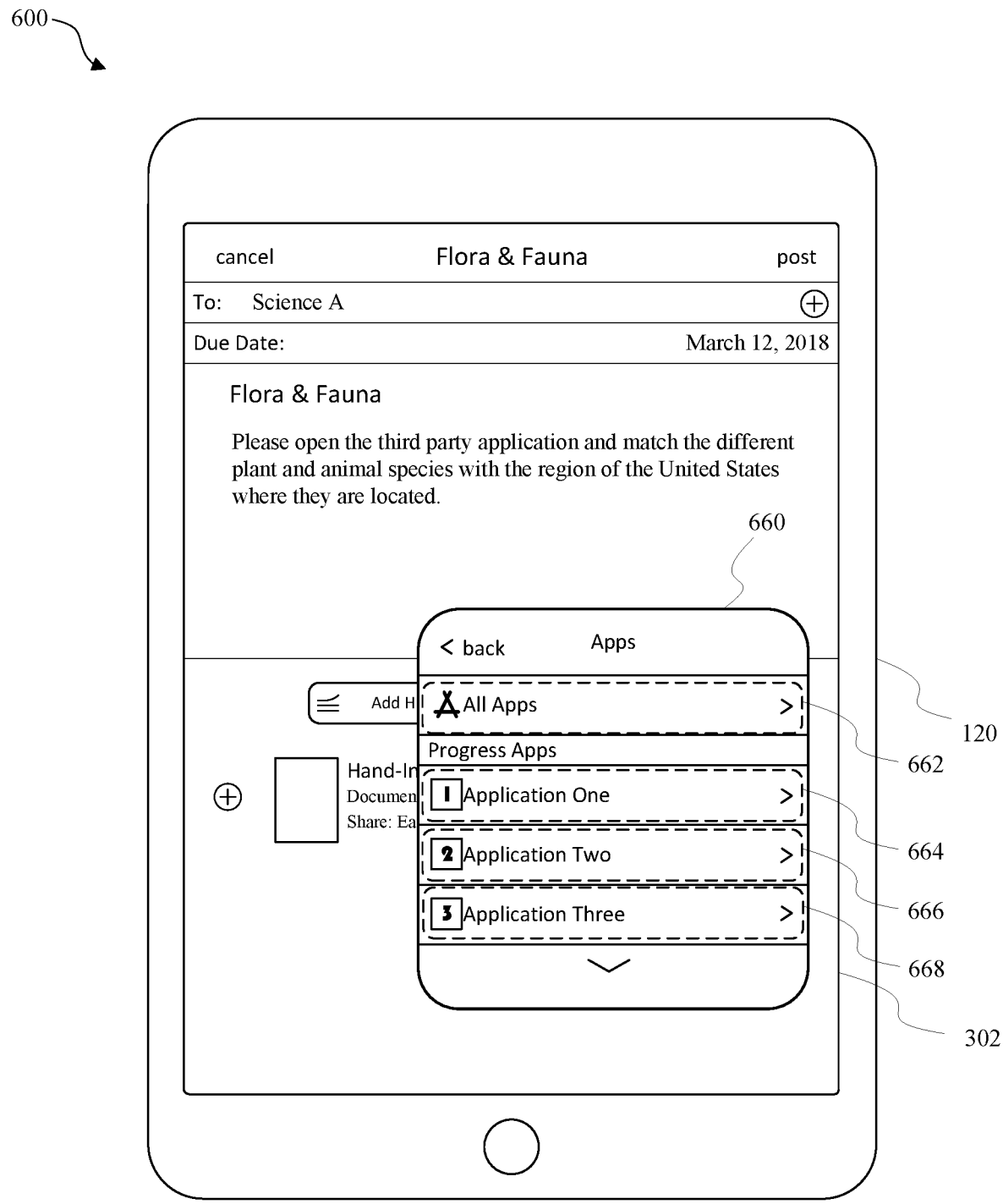

When a user selects the first user interface element 652 to attach an activity associated with a third-party application to the hand-out, the box 650 can be replaced with the box 660, as shown in FIG. 6D. The box 660 provides an instructor with the ability to select the third-party application for the activity from a list of applications.

In some embodiments, the box 660 includes a first user interface element 662 to select any application from a list of available applications. However, in some cases, some third-party applications can implement at least a portion of a class kit software framework that enables the third-party application to provide progress data to one or more services for tracking progress of students that complete activities within the third-party application. These third-party applications that implement at least a portion of the class kit software framework can be referred to herein as progress applications. The progress applications that implement at least a portion of the software framework can be listed separately in individual user interface elements below the first user interface element 662. For example, a second user interface element 664 enables an instructor to attach an activity for a first progress application, a third user interface element 666 enables an instructor to attach an activity for a second progress application, and a fourth user interface element 668 enables an instructor to attach an activity for a third progress application.

In some embodiments, a third-party application implements at least a portion of the class kit software framework, which provides a means for building interactive features into the third-party application. For example, the class kit software framework enables a software developer to define a context associated with the application. As used herein, a context refers to metadata that describes the structure of the application. For example, a digital textbook can be described using a context that defines the chapters, sections, pages, problem sets, and similar structure within the digital textbook. In general, a context defines metadata that enables an activity to be defined for the third-party application.

The context also enables progress of the activity within the application to be tracked. For example, referring back to the digital textbook example, an instructor can define an activity related to reading a chapter of the textbook. The context enables the instructor to specify the particular chapter or section in the digital textbook the instructor wants to assign when defining the activity. Therefore, when specifying an activity using the GUI 600, the client application 205 can consult the context to determine what activities can be completed within the third-party application.

In some embodiments, an instructor can manually search for a list of available contexts associated with one or more third-party applications and select a set of contexts that the instructor would like to assign to various hand-outs. The set of contexts can be saved in the memory 420 and associated with the client application 205 in order for the instructor to be able to attach activities associated with those contexts to a hand-out.

In other embodiments, each progress application installed on the client device 120 can notify the daemon 440 of available contexts provided by the progress application. The instructor can utilize the client application 205 to browse through a list of available contexts published by the one or more progress applications and select a number of contexts as favorite contexts. For example, by selecting the first user interface element 662 in the box 660, the instructor is able to browse all available contexts provided by the progress applications installed on the client device 120. The instructor can then select particular contexts as favorite contexts of the instructor. The subset of available contexts selected as favorites by the instructor can be stored in the local database 450 of the client device 120. The favorite contexts selected by the instructor can also be synced to a personal zone 465 in the remote database 460 scoped to the instructor. The additional user interface elements in the box 660 can then be displayed with each user interface element corresponding to a particular favorite context. The instructor can then select a particular favorite context to attach to the hand-out.

Figure 6E:
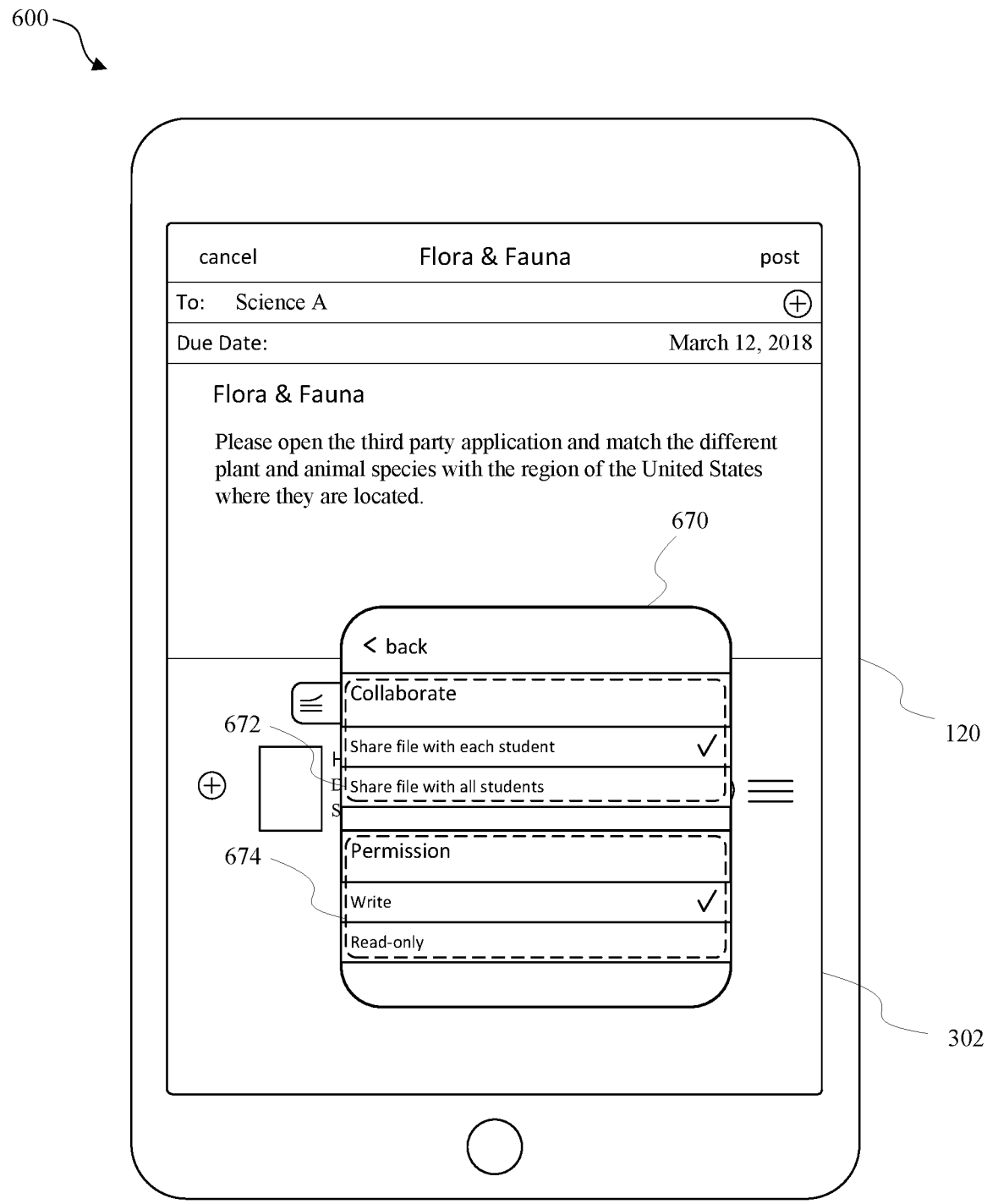

As shown in FIG. 6E, selecting the second user interface element 654 causes the client application 205 to display a box 670 that includes two user interface elements that enable an instructor to specify options associated with an attached file. In some embodiments, the options include permissions for the shared file as well as whether the file is collaborative. For example, as shown in FIG. 6E, a user interface element 672 enables an instructor to indicate whether the file is collaborative. This option determines whether the file is shared as a single resource among a plurality of users or whether a copy of the file is shared with each user individually. A user interface element 674 enables an instructor to change permissions for the resource for the file. If the resource is read-only, then the student will not be able to edit the resource; however, if the resource is read-write, then the student can edit the file.

It will be appreciated that additional user interface elements, not explicitly shown in FIG. 6E can be included in the box 670. For example, other user interface elements could enable an instructor to specify a file stored in the local memory 420 to attach to the hand-out.

Figure 7:
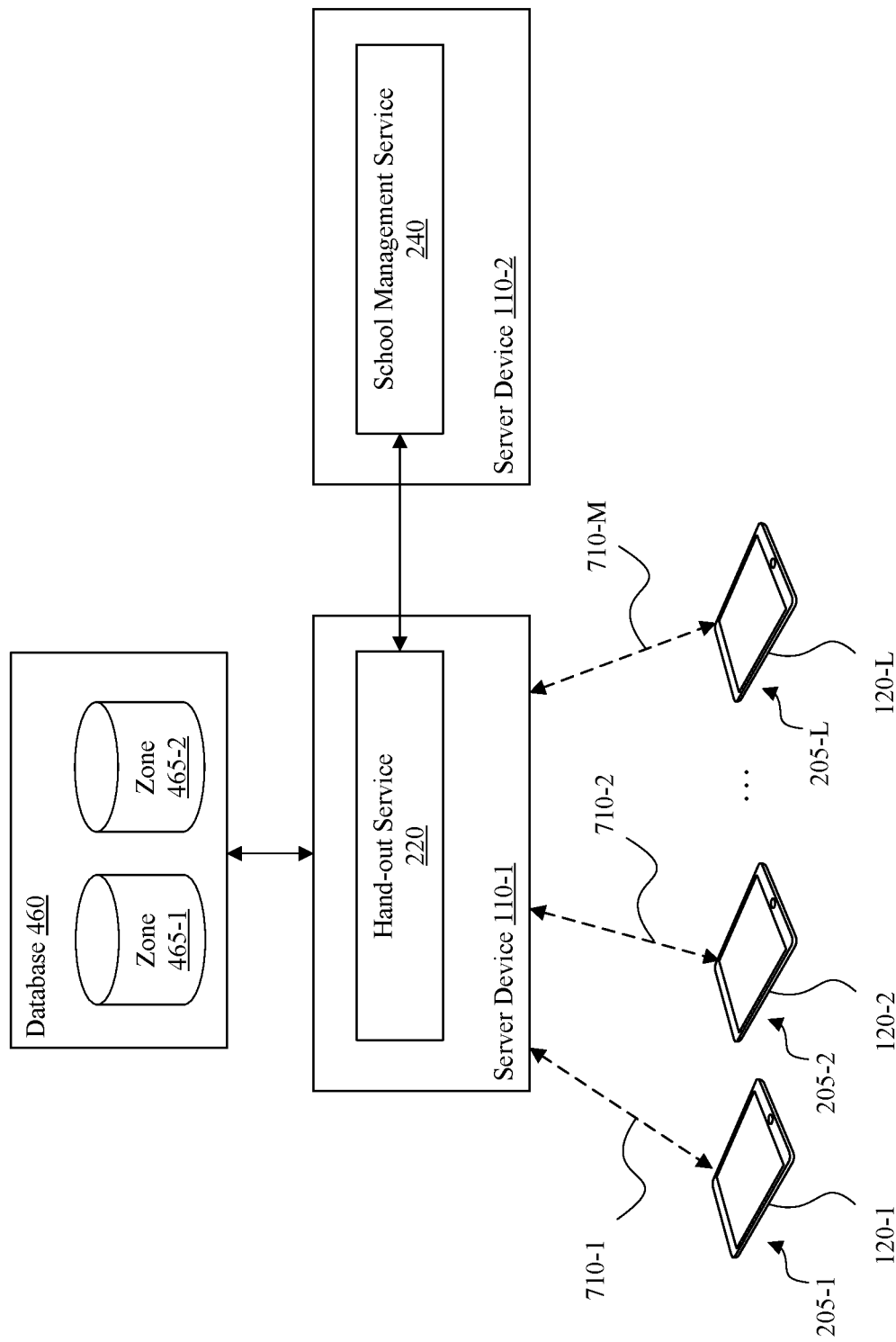
FIG. 7 illustrates a client-server relationship between the hand-out service and a number of client application(s) and/or daemon(s) associated with a plurality of students in a class, in accordance with some embodiments.

FIG. 7 illustrates a client-server relationship between the hand-out service 220 and a number of client application(s) 205 and/or daemon(s) 440 associated with a plurality of students in a class, in accordance with some embodiments. As shown in FIG. 7, a class can include L students enrolled in the class, each student having access to one or more client devices 120. As described above, the hand-out service 220 is configured to enable an instructor to create and manage hand-outs using a plurality of different client devices 120 controlled by the instructor. In addition, the hand-out service 220 is also configured to assist in distributing hand-outs to a client application 205 included in a plurality of additional client devices 120 associated with a group of students.

In some embodiments, an instructor can finish preparing the hand-out and then publish the hand-out to assign the hand-out to the group of students to view and complete. The hand-out service 220 copies the hand-out into a hand-out zone 465, scoped to a group of students specified in the hand-out, in the remote database 460. In response to the instructor publishing the hand-out, the hand-out service 220 notifies each of the client devices 120 associated with the students, over a variety of paths 710, that the hand-out zone 465 in the remote database 460 has been updated. A path 710 can refer to a network path associated with a destination address for a network interface of a particular client device 120.

The notification can be received by the daemon 440 included in each of the client devices 120. The daemon 440 then downloads the data from the hand-out zone 465 to the local database 450 in the client device 120. In some embodiments, the hand-out service 220 utilizes the school management service 240 in order to retrieve user identifiers for the students in the class. The user identifiers can be utilized to transmit the notifications, using a separate notification service, to each of the client devices 120 associated with a student in the given class.

In some embodiments, the group of students can be identified by the school management service 240, which, in response to receiving a request from the hand-out service 220, is configured to return a list of identifiers for the students enrolled in a particular class. In other embodiments, a roster service can interface with the school management service 240 to create roster data in a roster zone 465 of the remote database 460 scoped to the organization. The hand-out service 220 can then access the roster data from the remote database 460 instead of getting the roster data from the school management service 240 directly.

In response to the request to publish a hand-out, the hand-out service 220 can copy the hand-out from a personal zone 465 scoped to the instructor to a hand-out zone 465 scoped to the group of students in the class. Once the copy of the hand-out is stored in the hand-out zone 465, the hand-out service 220 transmits a notification of the change to any client devices associated with students that are subscribed to the hand-out zone 465. The daemon 440 included in a client device 120 of a student that is associated with the hand-out zone 465 will automatically download the copy of the hand-out stored in the hand-out zone 465 to a local memory of the client device 120 in response to receiving the notification from the hand-out service 220. The hand-out can then be viewed by the client application 205 of the client device 120 for the student such that the student can complete the activities and/or view the materials attached to the hand-out.

Figure 8:
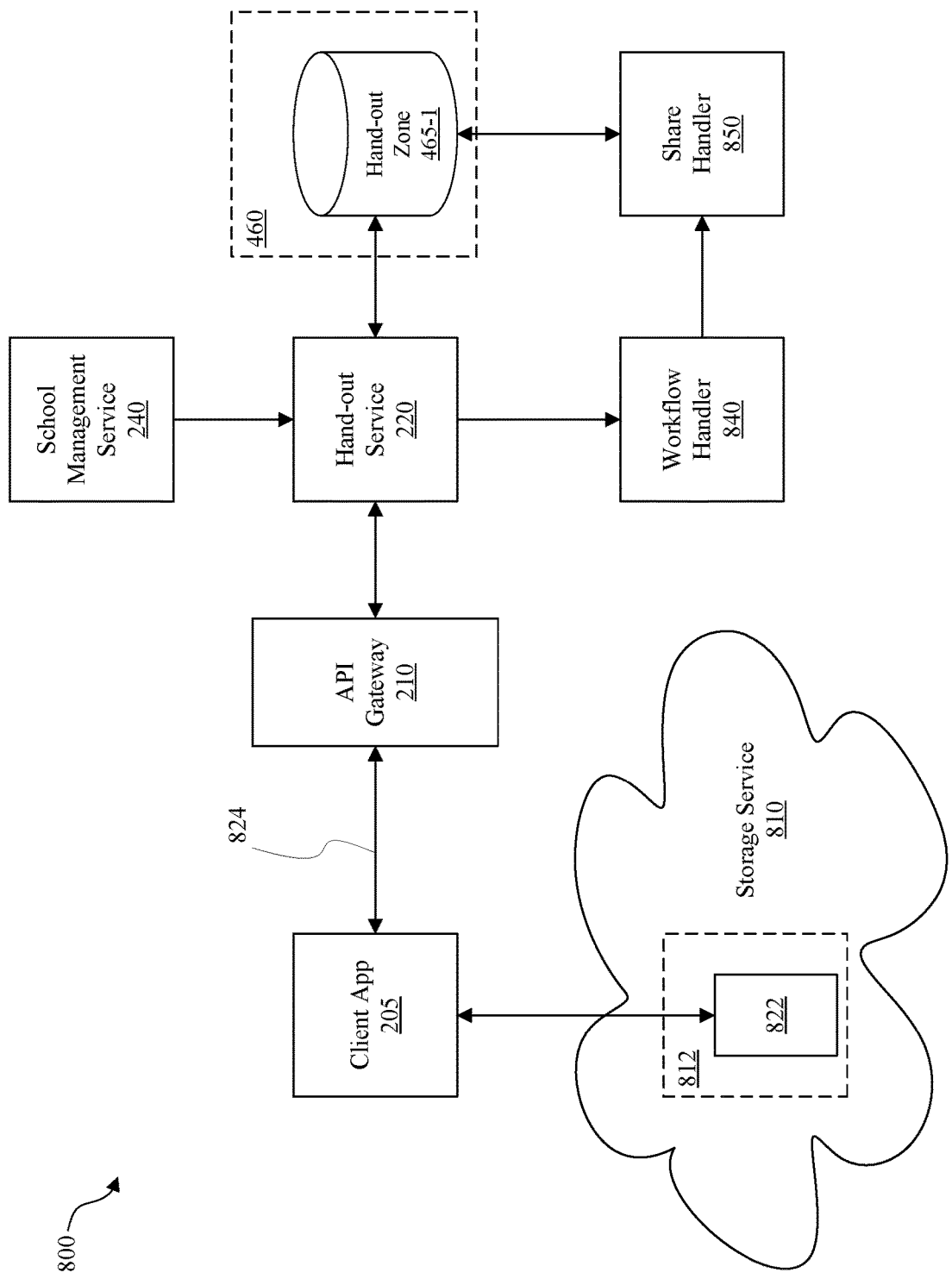
FIG. 8 illustrates a client-server architecture for sharing files between instructors and students, in accordance with some embodiments.

FIG. 8 illustrates a client-server architecture 800 for sharing files between instructors and students, in accordance with some embodiments. It will be appreciated that an instructor can publish a hand-out, and, in some cases, students can immediately try to access the hand-out, including any attachments included therein, through their client devices 120. Consequently, the mechanism for sharing attachments between teachers and students should minimize a lag between when the hand-out is published and when the attachments are synced to a local memory 420 of a client device 120 for each of the students.

As shown in FIG. 8, the client-server architecture 800 includes a storage service 810, a workflow handler 840, and a share handler 850 that interface with the client application 205, the hand-out service 220, and/or the remote database 460. The storage service 810 provides memory, included in one or more server devices 110, which can be allocated to different users. For example, each of the instructors and/or students can be allocated a portion of memory (e.g., 5 GB of memory) in the one or more server devices 110 as a partition of the storage service 810. In some embodiments, the storage service 810 is a cloud-based storage service such as Amazon® S3 or any similar cloud-based storage service.

When an instructor attaches a file to a hand-out, the file will be shared with a number of students when the hand-out is published. The storage service 810 can be utilized by a set of client devices 120 to facilitate the sharing of these files. In some embodiments, an instructor, through the client device 120, stores a file 822 within a partition 812 of the storage service 810 allocated to the instructor. Once the file 822 is stored in the partition 812, the client application 205, via the client device 120, transmits metadata related to the file 822 within a data structure 824 for the hand-out that is transmitted to the hand-out service 220, via the API gateway 210.

The data structure 824 is stored in a hand-out zone 465, scoped to the class or group of students to which the hand-out is assigned, within the remote database 460. In some embodiments, the hand-out service 220 pulls roster data from the school management service 240, such as determining a set of directory service identifiers for the group of students enrolled in a class identified by a class identifier. The hand-out service 220 can also pull directory service identifiers for any additional instructors that are associated with the class (e.g., if the class has multiple instructors). The client-server architecture 800 is configured to enable each of the students and/or additional instructors in the class to access the file 822 and/or clones of the file within the storage service 810.

In some embodiments, the hand-out service 220 is configured to transmit a request to the workflow handler 840 to share the file with a number of students and/or additional instructors associated with the class. The workflow handler 840 operates asynchronously from the hand-out service 220. In some embodiments, the workflow handler 840 includes a queue to store requests from the hand-out service 220. The workflow handler 840 pops requests from the queue and transmits the requests to the share handler 850. In some embodiments, the workflow handler 840 inspects the requests to ensure the requests are valid. Invalid requests can be discarded, while valid requests are forwarded to the share handler 850. In other embodiments, the workflow handler 840 can perform additional operations or processing related to the requests, such as replacing a class identifier included in the request with a list of directory service identifiers corresponding to the students enrolled in the class.

The share handler 850 is configured to process the requests in order to share the file 822 with a class. The share handler 850 reads the request, which includes the metadata related to the file 822 as well as information such as a directory service identifier for each of the one or more students and/or additional instructors associated with the class. The share handler 850 interfaces with a number of additional services, including a pool service and a sharing service.

Figure 9:
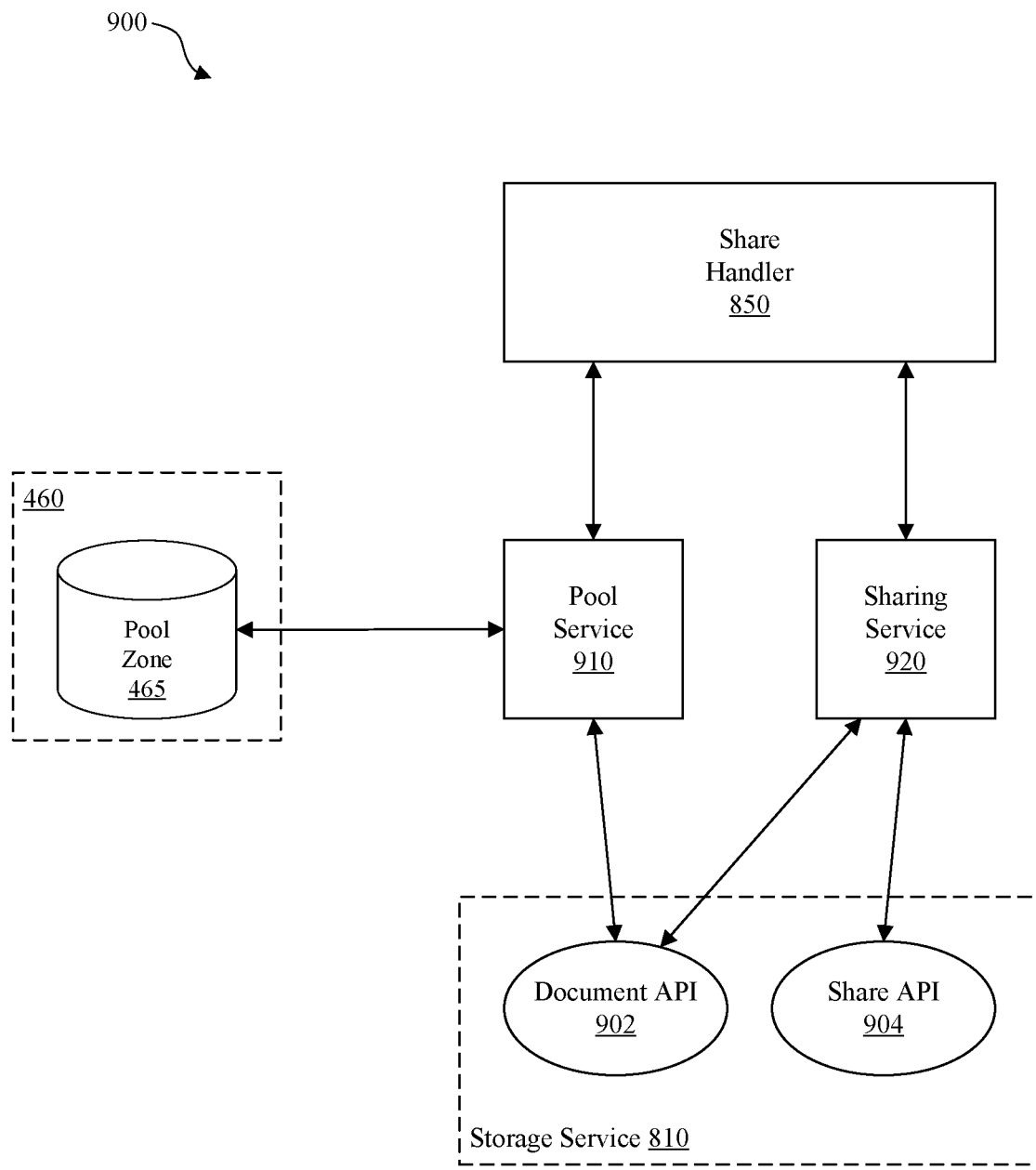
FIG. 9 illustrates a sharing architecture for creating share pools within a storage service, in accordance with some embodiments.

FIG. 9 illustrates a sharing architecture 900 for creating share pools within a storage service 810, in accordance with some embodiments. As used herein, a share pool refers to a set of stub files (e.g., empty placeholder files) that can be used to share a resource stored in a particular partition 812 of the storage service 810 with a plurality of different users of the storage service 810. The set of stub files is created in a hidden folder of the partition 812 of the storage service 810 allocated to an instructor. Creating the stub files within the partition 812 enables faster sharing of a particular resource among users of the storage service 810 compared to creating copies of the resource from scratch.

As shown in FIG. 9, in some embodiments, the share handler 850 is connected to a pool service 910 and a sharing service 920. The pool service 910 manages share pools created in various partitions of the storage service 810. The pool service 910 utilizes a pool zone 465 in the remote database 460, scoped to a particular user, such as the instructor. The pool service 910 is configured to create a share pool for each instructor such that the instructor can quickly share files attached to a hand-out. The pool service 910 utilizes a document API 902, implemented as part of the storage service 810, to create a number of stub files in the partition 812 of the storage service 810 allocated to the instructor. In some embodiments, the stub files are created in a hidden folder of the partition 812 such that the share pool is not visible to a user when viewing a representation of the partition 812 of the storage service 810.

In some embodiments, the storage service 810 enables a user, such as the instructor, to store various files within a partition 812 allocated to the user. The storage service 810 can store files within a file system structure, such as a hierarchy of various folders or directories. Consequently, a root folder or directory is associated with the user and represents the sum total of the storage space allocated to the user. The user can then define additional folders or directories that reside in the root folder or directory. Each folder or directory can include files associated with that folder or directory. Each folder or directory can also include sub-folders or sub-directories. Therefore, a folder hierarchy or directory structure is created within the root folder or directory.

In some embodiments, the pool service 910 creates a hidden folder in the partition 812 that is not visible to a user. The pool service 910 then creates a number of stub files in the hidden folder. The number of stub files can be equal to a pre-defined threshold to generate a share pool of a particular size (e.g., number of stub files).

In some embodiments, the number of stub files can be set based on a class size for an organization. For example, the pool service 910 can determine an average number of students enrolled in the classes offered by a school district. The pool service 910 can then set the pre-defined threshold to create a share pool having a size based on a multiple of the average number of students enrolled in classes offered by the school district. For example, if the average number of students in a class for the school district is 25, then the number of placeholder files can be set to, e.g., three times the average number of students in a class—75. Alternatively, the size of the share pool can be based on a maximum number of students in any class for the organization. In yet other embodiments, the size of the share pool can be set manually and is unrelated to any roster data provided by the school management service 240. For example, analysis of a number of organizations can determine that a share pool size equal to 50 is typically adequate for most use cases and, therefore, the pre-defined threshold is manually set at 50.

The pool service 910 creates the stub files in the hidden folder of the partition 812 of the storage service 810 allocated to the instructor. The pool service 910 then stores metadata related to the stub files in a pool zone 465, scoped to the instructor, of the remote database 460. For example, the pool service 910 can store a reference to each stub file in the share pool in the pool zone 465. The reference can indicate an identifier associated with the stub file and/or a location of the stub file in the partition 812. For example, each stub file can be assigned a unique identifier when the stub file is stored in the partition 812. Each stub file can then be referenced using a particular URL that includes the unique identifier for the stub file. Different URLs can be used to perform different operations related to the stub file, such as editing the stub file, deleting the stub file, moving the stub file to a different location in the partition 812, downloading a copy of the stub file, and so forth.

Once the share pool (e.g., a number of stub files) has been created, the pool service 910 can process requests from the share handler 850 to allocate specific stub files within the share pool to be utilized to share a resource stored in the partition 812 with a number of students. As discussed above, an instructor can attach a file 822 to a hand-out, specifying a number of options for sharing the file 822 when attaching the file 822 to the hand-out. In some cases, the file 822 is shared among a plurality of users, each of the users can be granted access to view and/or edit the file 822 stored in the storage service 810. Alternatively, the instructor can specify that each user receives access to a separate and distinct copy of the file 822 (e.g., a clone), such that each student could potentially edit a different copy of the file 822 to turn in to the instructor. In such cases, a subset of stub files in the share pool can be selected in order to generate clones of the file 822 to share with the plurality of users (e.g., students and/or additional instructors).

It will be appreciated that the reason for the share pool is not immediately clear, because the stub files do not contain any of the data stored in the seed file 822. However, a latency related to creating a new copy of the file 822 in the partition 812 can be much greater than a latency of changing a reference of a previously created stub file to point to the file 822. Consequently, the time for a student to be granted access to a shared copy of the file can be reduced from minutes to seconds using the share pool, simply due to the nature of the storage service 810.

The share handler 850, in response to receiving a request to share a particular file 822 with a group of students, transmits a request to the pool service 910 to determine if the share pool includes a number of stub files equal to the number of students and/or additional instructors in the class. If the number of stub files in the share pool exceeds the number of requested stub files, then the pool service 910 can return a list of references to a number of stub files to be used by the share handler 850. Alternatively, if the number of stub files in the share pool is less than the number of requested stub files, then the pool service 910 can create additional stub files in the share pool using the documents API 902.

Once the share handler 850 has confirmed that there are sufficient numbers of stub files in the share pool, the share handler 850 calls the sharing service 920 in order to create clones of the file 822 using the stub files. The sharing service 920 utilizes the document API 902 as well as the share API 904 in order to generate the clones of the file 822.

In some embodiments, the document API 902 enables the pool service 910 and/or the sharing service 920 to perform various file operations. For example, the document API 902 enables the pool service 910 to generate new stub files in the hidden folder in order to ensure that the number of stub files in the share pool is greater than or equal to the pre-defined threshold. The document API 902 can also be used to move the placeholder files from the hidden folder to another folder in the partition 812 of the storage service 810 allocated to the instructor. The document API 902 can also be used to rename the stub files.

In some embodiments, the sharing service 920 utilizes the document API 902 to move a stub file from the share pool into a different folder in the partition 812 created for a corresponding hand-out. It will be appreciated that, in some embodiments, the stub file is not moved in the physical memory in order to move the stub file into the new folder and that only the metadata for the stub file may need to be changed in order to change a reference to a location for the stub file. The sharing service 920 then renames the stub file, using the document API 902, to associate the stub file with a file name that reflects the student and/or additional instructor associated with a particular clone of the file 822. The sharing service 920 will repeat this procedure for each student and/or additional instructor to whom the file 822 is shared. For example, a first stub file could be moved to a folder for "Hand-out 1—March 15" and assigned a file name "Student 1—document"; a second stub file is moved to the same folder and assigned a file name "Student 2—document"; and so forth.

Once all of the stub files required to share the file 822 have been moved from the share pool to the folder for the hand-out, the sharing service 920 utilizes the share API 904 to grant permissions to the various users to have access to the clones of the file 822 in the partition 812. It will be appreciated that the document API 902 has merely moved files from the share pool located in the hidden folder of the partition 812 to a different folder of the partition 812 and changed the file names associated with the stub files. The students and/or additional instructors typically do not have access to such files in the partition 812 of the storage service 810 allocated to the instructor. Thus, the share API 904 is utilized by the sharing service 920 in order to make the clones of the file 822 visible to the other users, even though they are located in the partition 812 of the storage service 810 allocated to the instructor.

In some embodiments, the share API 904 can grant access to a file in a particular partition of the storage service 810 to other users of the storage service 810. The share API 904 can modify data structures that associate individual files or folders/directories in a particular partition of the storage service 810 with other users not typically associated with that partition of the storage service 810. For example, a user can utilize the share API 904 to let a person view a file stored on the user's partition of the storage service 810 by sending a link associated with the share API 904 to a different person via email. Consequently, the share API 904 can be utilized by the sharing service 920 in order to associate a directory service identifier for each student and/or additional instructors in the class with a corresponding clone stored in a partition 812 of the storage service 810 allocated to the instructor.

Each individual student and/or additional instructor in a class will then have access to one of the clones of the file 822. In some embodiments, a student will be able to view a clone of the file 822 shared with the student even though the clone of the file 822 is located within the partition 812 of the storage service 810 allocated to the instructor and not a separate partition of the storage service 810 allocated to the student. In some embodiments, the share API 904 can also set permissions for the clone of the file 822, which can include read-only or full read-write privileges.

Figure 10:
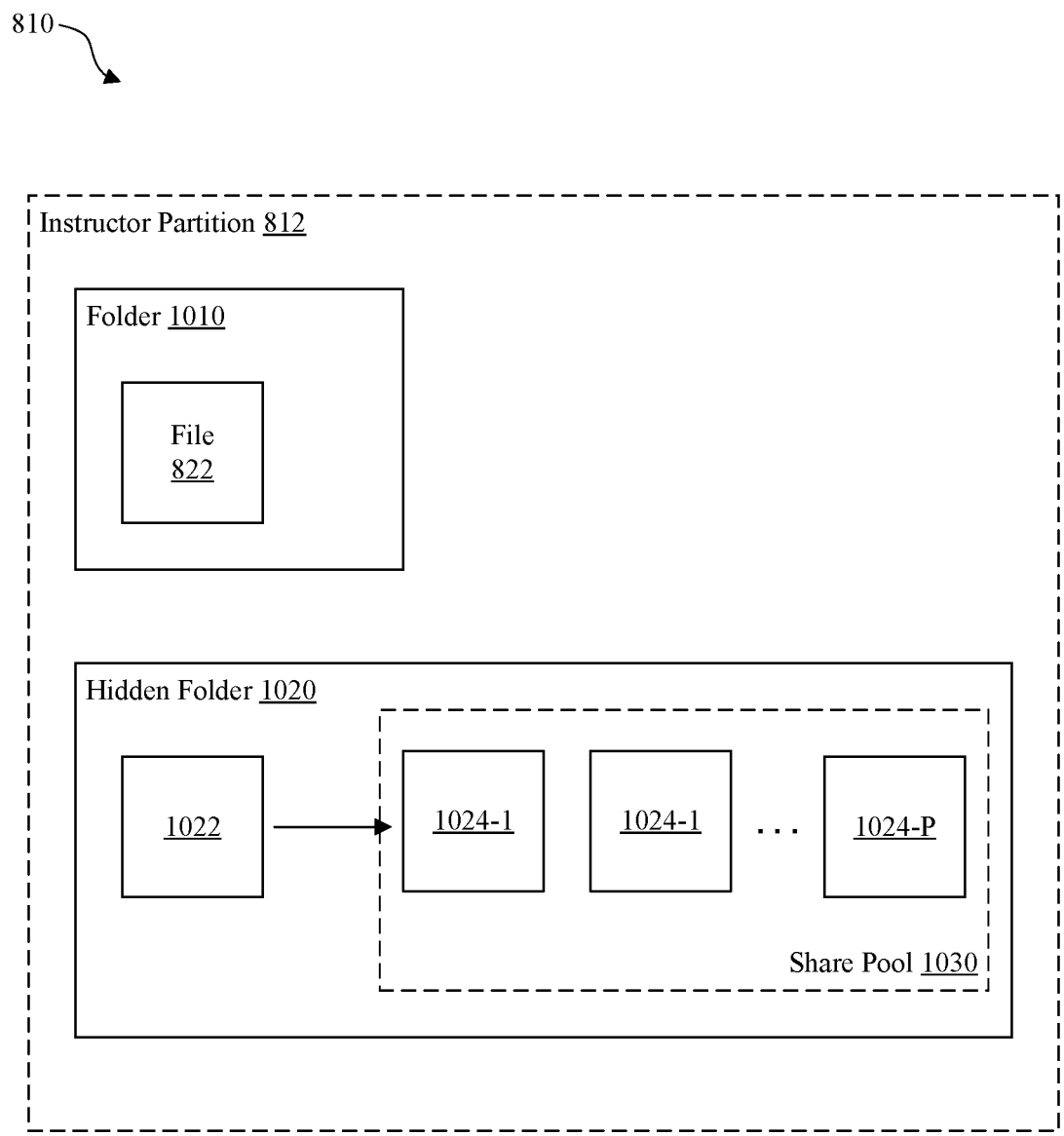
FIG. 10 illustrates a partition of the storage service allocated to an instructor, in accordance with some embodiments.

FIG. 10 illustrates a partition 812 of the storage service 810 allocated to an instructor, in accordance with some embodiments. An amount of memory included in one or more server devices 110 is allocated to the instructor to store various files or data structures. It will be appreciated that the partition 812 can be split among a plurality of server devices 110 and physical storage mediums such as HDDs, SSDs, and the like. In some embodiments, the partition 812 represents a virtual drive allocated to the user, wherein the virtual drive includes blocks of virtual memory mapped to various blocks of physical memory on the one or more server devices 110. In some cases, each block of virtual memory can be mapped to multiple blocks of physical memory in order to implement replicated data storage. The replicated data storage ensures high availability of the data stored with the storage service 810.

As shown in FIG. 10, a file 822 is stored in a folder 1010, and a seed file 1022 is stored in a second folder 1020. The seed file is a master copy of a stub file 1024. The folder 1020 is hidden such that the instructor is unaware that the folder 1020 is allocated within the partition 812. The folder 1020 also includes a share pool 1030, which includes a number of stub files 1024 that comprise copies of the seed file 1022. The number of stub files 1024 is equal to a pre-determined threshold that indicates the size of the share pool 1030.

Figure 11:
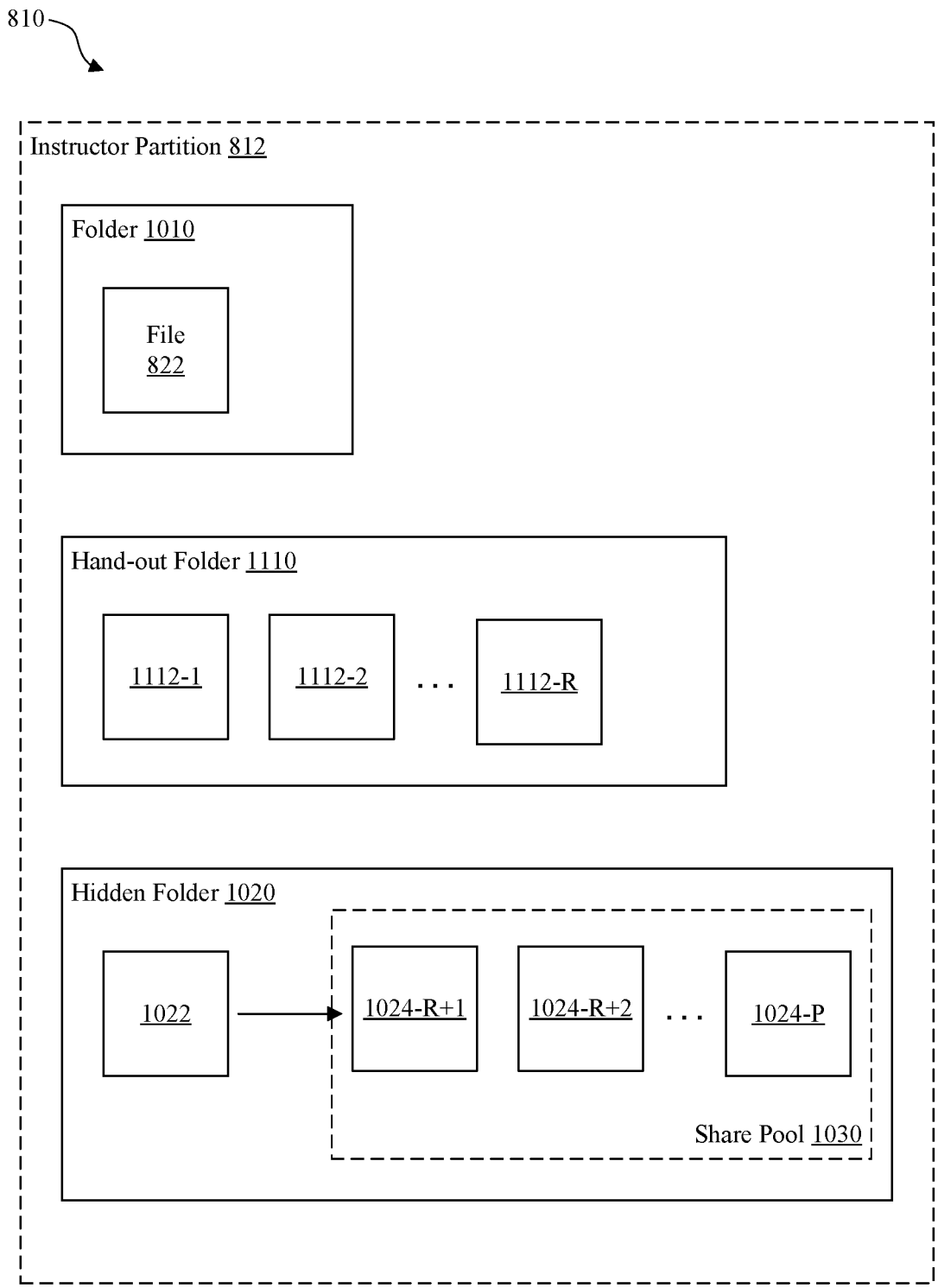
FIG. 11 illustrates a number of clones of a file created from stub files in the share pool, in accordance with some embodiments.

FIG. 11 illustrates a number of clones of a file 822 created from stub files 1024 in the share pool 1030, in accordance with some embodiments. As shown in FIG. 11, a number R of stub files 1024 have been removed from the share pool 1030 and moved into a hand-out folder 1110 in the partition 812 of the storage service 810 allocated to the instructor. The stub files 1024 are renamed and associated with a particular student or additional instructor for the class, and the stub files 1024 are written with data from the file 822 to generate the set of clones 1112 for the file 822, each clone 1112 associated with a particular student or additional instructor in the class.

As shown in FIG. 11, when placeholder files 1024 have been removed from the share pool 1030, the share pool 1030 may need to be replenished. The pool service 910 is configured to monitor a size of the share pool 1030 and periodically create new stub files 1024 within the share pool 1030. In some embodiments, the pool service 910 automatically replenishes the share pool 1030 in a background process whenever stub files 1024 have been provided to the share handler 850 to create new clones 1112 of a file 822.

Figure 12:
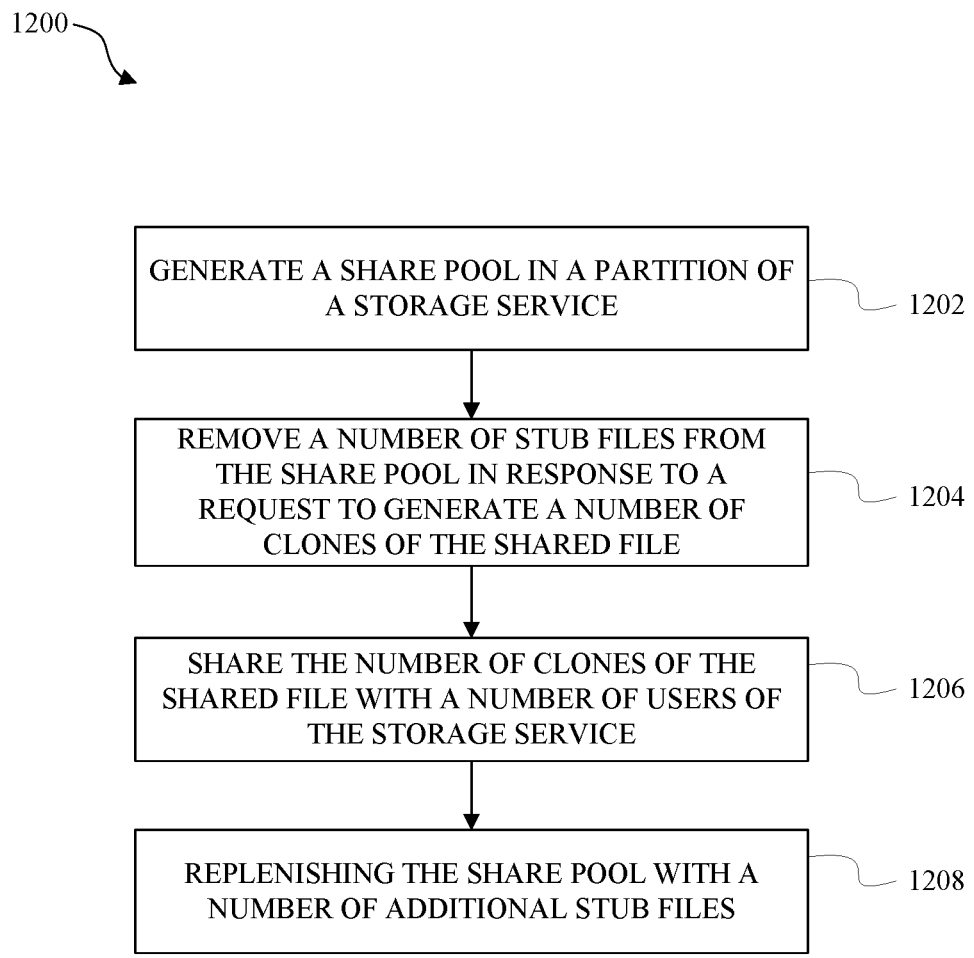
FIG. 12 is a flow chart of a method for managing a share pool, in accordance with some embodiments.

FIG. 12 is a flow chart of a method 1200 for managing a share pool, in accordance with some embodiments. The method 1200 is carried out by one or more services. In some embodiments, the method 1200 can be implemented as logic configured to maintain a share pool 1030 in a partition 812 of a storage service 810 allocated to an instructor. The logic can include instructions, executed by a processor of a server device 110, for creating stub files in the share pool and removing stub files from the share pool to generate clones of a shared file. In some embodiments, the method 1200 is implemented within logic implemented by share handler 850, in conjunction with pool service 910 and/or sharing service 920.

At 1202, a share pool is generated in a partition of a storage service. In some embodiments, the partition of the storage service is a set of storage resources allocated to an instructor of a class. The storage service can be a cloud-based storage service. The share pool includes a plurality of stub files, which are copies of a seed file that is a placeholder file that contains no content related to a shared file.

At 1204, a number of stub files are removed from the share pool in response to a request to generate a number of clones of the shared file. In some embodiments, a share handler 850 receives a request to share a file 822 as attached to a hand-out. The hand-out can include a group of students for which the file 822 should be shared. The share handler 850 requests a list of references to a number of stub files from a pool service 910. The pool service 910 selects a subset of stub files included in the share pool and returns references to the subset of stub files to the share handler 850. The subset of stub files will be utilized to generate clones of the file 822 in the partition 812 of the storage service 810.

At 1206, the number of clones of the shared file are shared with a number of users of the storage service. In some embodiments, the stub files can be renamed and content from the file 822 is copied into each of the stub files stored in the partition 812. The stub files can also be moved from a first location in the partition 812 (e.g., a hidden folder associated with the share pool) to a second location in the partition 812 (e.g., a hand-out folder). The sharing service 920 is utilized to associate an identifier associated with each student in the group of students with a particular clone of the file 822 stored in the partition 812, which enables a user associated with the identifier to view and/or modify that particular clone of the file 822.

At 1208, the share pool is replenished with a number of additional stub files. In some embodiments, the pool service 910 is automatically configured to replenish the share pool whenever stub files are removed to generate clones of a shared file.

Figure 13:
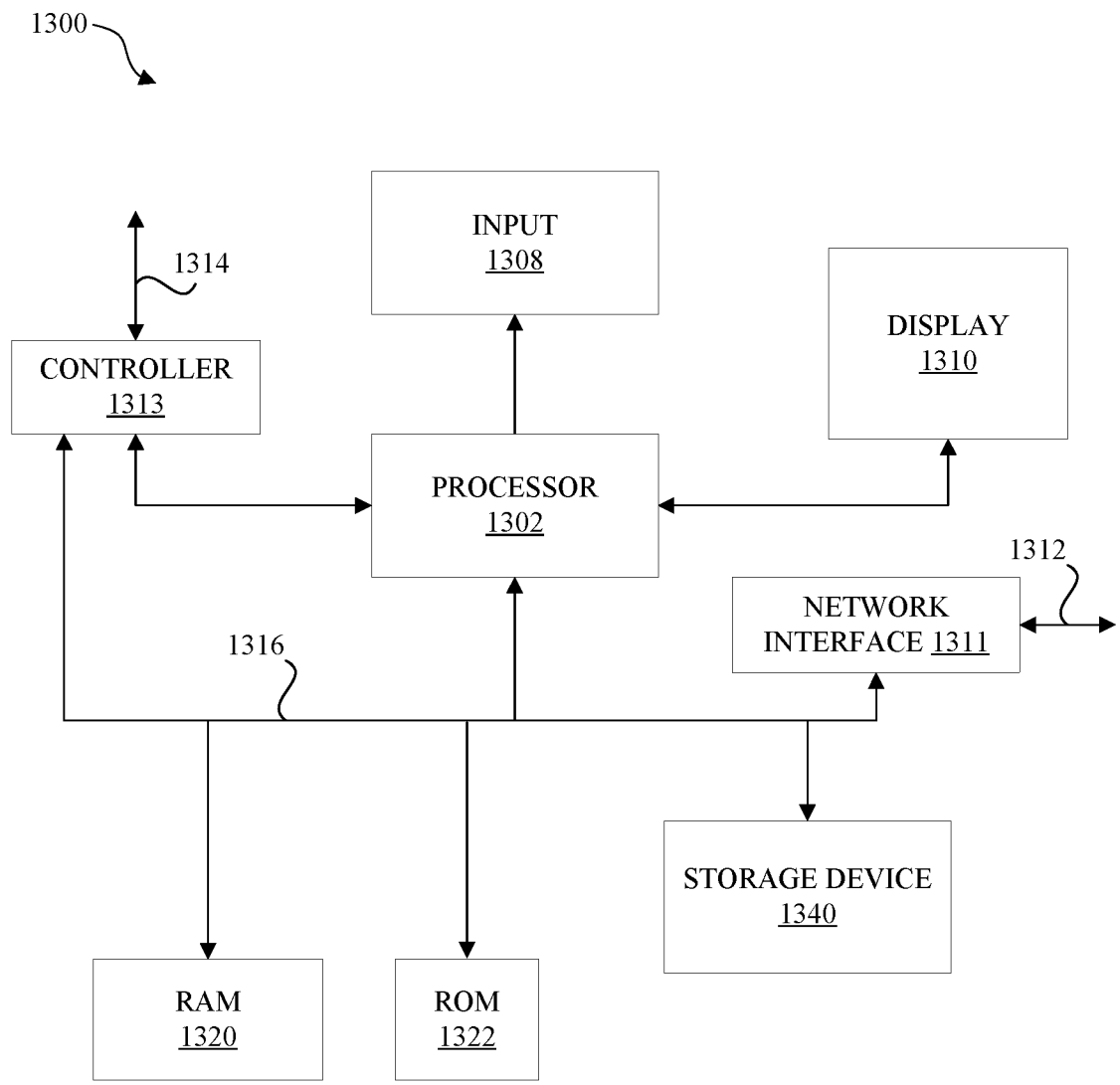
FIG. 13 illustrates a detailed view of an exemplary computing device that can be used to implement the various apparatus and/or methods described herein, in accordance with some embodiments.

FIG. 13 illustrates a detailed view of an exemplary computing device 1300 that can be used to implement the various apparatus and/or methods described herein, in accordance with some embodiments. In particular, the detailed view illustrates various components that can be included in the computing devices illustrated in FIGS. 1 to 11 and/or described herein. For example, one or more of the server devices(s) 110, client device(s) 120, or any other device including any network devices and/or consumer electronics can include the components of computing device 1300.

As shown in FIG. 13, the computing device 1300 can include a processor 1302 that represents a microprocessor or controller for controlling the overall operation of computing device 1300. The computing device 1300 can also include a user input device 1308 that allows a user of the computing device 1300 to interact with the computing device 1300. For example, the user input device 1308 can take a variety of forms, such as a button, keypad, dial, touch screen, audio input interface, visual/image capture input interface, input in the form of sensor data, etc. Still further, the computing device 1300 can include a display 1310 (screen display) that can be controlled by the processor 1302 to present visual information to the user. A data bus 1316 can facilitate data transfer between at least a storage device 1340, the processor 1302, and a controller 1313. The controller 1313 can be used to interface with and control different equipment through an equipment control bus 1314. The computing device 1300 can also include a network/bus interface 1311 that couples to a data link 1312. In the case of a wireless connection, the network/bus interface 1311 can include a wireless transceiver.

The computing device 1300 also include a storage device 1340, which can comprise a single disk or a plurality of disks (e.g., hard drives), and includes a storage management module that manages one or more partitions within the storage device 1340. In some embodiments, storage device 1340 can include flash memory, semiconductor (solid state) memory or the like. The computing device 1300 can also include a Random Access Memory (RAM) 1320 and a Read-Only Memory (ROM) 1322. The ROM 1322 can store programs, utilities or processes to be executed in a non-volatile manner. The RAM 1320 can provide volatile data storage, and stores instructions related to the operation of the computing device 1300.

As described above, one aspect of the present technology is the gathering and use of data available from various sources to track progress of students at completing assignments. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the instructional experience of individuals attending a school. Accordingly, use of such personal information data enables instructors to tailor their lessons or individual attention to students' needs. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of progress tracking services, the present technology can be configured to allow users to select to "opt in" or "opt out" of participation in the collection of personal information data during registration for services or anytime thereafter. In another example, users can select not to provide progress tracking information for specific third-party applications. In yet another example, users can select to limit the scope of data that is collected or entirely prohibit the collection of progress tracking information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, progress tracking can be implemented based on non-personal information data or a bare minimum amount of personal information, such as other non-personal information available to the progress tracking pipeline, or publicly available information.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for providing access to a file through a storage service, the method comprising, by a hardware server device that implements the storage service:
    generating a share pool in a partition of the storage service, wherein the share pool includes a plurality of stub files;
    receiving a request to establish a plurality of clones that correspond to the file;
    selecting, based on a number of the plurality of clones, a subset of stub files from the plurality of stub files;
    migrating the subset of stub files from the share pool to a folder associated with the file, such that the subset of stub files are removed from share pool and added to the folder;
    establishing the plurality of clones by updating the subset of stub files to reference the file;
    sharing the plurality of clones with a plurality of users of the storage service to enable client devices to access the file; and
    in response to identifying, based on a satisfaction of a threshold, that the share pool requires additional stub files:
        generating the additional stub files to replenish the share pool.

2. The method of claim 1, wherein each stub file of the plurality of stub files is a copy of a seed file that does not include any content related to the file.

3. The method of claim 1, wherein the partition of the storage service is allocated to an instructor for a class.

4. The method of claim 3, wherein each clone of the plurality of clones includes an identifier associated with a respective student enrolled in the class.

5. The method of claim 1, wherein:
    the threshold is satisfied when a number of the plurality of stub files in the share pool is less than a predefined amount; and
    the threshold value is based on a multiple of an average number of users associated with the partition of the storage service.

6. The method of claim 1, wherein establishing the plurality of clones by updating the subset of stub files based on the file further comprises, for each stub file of the subset of stub files:
    changing a file name for the stub file; and
    copying content related to the file into the stub file.

7. The method of claim 6, wherein:
    the share pool is a hidden folder in the partition, and
    the folder is a visible folder.

8. The method of claim 1, wherein the storage service implements:
    a document application programming interface (API) for performing file operations on files in the partition of the storage service; and
    a share API for granting access to the files in the partition of the storage service to other users of the storage service.

9. A non-transitory computer readable storage medium configured to store instructions that, when executed by at least one hardware processor included in a hardware server device, cause the hardware server device to provide access to a file through a storage service implemented the hardware server device, by carrying out steps that include:
    generating a share pool in a partition of the storage service, wherein the share pool includes a plurality of stub files;
    receiving a request to establish a plurality of clones that correspond to the file;
    selecting, based on a number of the plurality of clones, a subset of stub files from the plurality of stub files;
    migrating the subset of stub files from the share pool to a folder associated with the file, such that the subset of stub files are removed from share pool and added to the folder;
    establishing the plurality of clones by updating the subset of stub files to reference the file;
    sharing the plurality of clones with a plurality of users of the storage service to enable client devices to access the file; and
    in response to identifying, based on a satisfaction of a threshold, that the share pool requires additional stub files:
        generating the additional stub files to replenish the share pool.

10. The non-transitory computer readable storage medium of claim 9, wherein each stub file of the plurality of stub files is a copy of a seed file that does not include any content related to the file.

11. The non-transitory computer readable storage medium of claim 9, wherein the partition of the storage service is allocated to an instructor for a class.

12. The non-transitory computer readable storage medium of claim 11, wherein each clone of the plurality of clones includes an identifier associated with a respective student enrolled in the class.

13. The non-transitory computer readable storage medium of claim 9, wherein:
the threshold is satisfied when a number of the plurality of stub files in the share pool is less than a predefined amount; and
the threshold value is based on a multiple of an average number of users associated with the partition of the storage service.

14. The non-transitory computer readable storage medium of claim 9, wherein establishing the plurality of clones by updating the subset of stub files based on the file further comprises, for each stub file of the subset of stub files:
changing a file name for the stub file; and
copying content related to the file into the stub file.

15. The non-transitory computer readable storage medium of claim 14, wherein:
the share pool is a hidden folder in the partition, and
the folder is a visible folder.

16. A hardware server device that implements a storage service for providing access to a file, the hardware server device comprising:
at least one hardware processor; and
at least one memory storing instructions that, when executed by the at least one hardware processor, cause the hardware server device to carry out steps that include:
generating a share pool in a partition of the storage service, wherein the share pool includes a plurality of stub files;
receiving a request to establish a plurality of clones that correspond to the file;
selecting, based on a number of the plurality of clones, a subset of stub files from the plurality of stub files;
migrating the subset of stub files from the share pool to a folder associated with the file, such that the subset of stub files are removed from share pool and added to the folder;
establishing the plurality of clones by updating the subset of stub files to reference the file;
sharing the plurality of clones with a plurality of users of the storage service to enable client devices to access the file; and
in response to identifying, based on a satisfaction of a threshold, that the share pool requires additional stub files:
generating the additional stub files to replenish the share pool.

17. The hardware server device of claim 16, wherein each stub file of the plurality of stub files is a copy of a seed file that does not include any content related to the file.

18. The hardware server device of claim 16, wherein the partition of the storage service is allocated to an instructor for a class.

19. The hardware server device of claim 18, wherein each clone of the plurality of clones includes an identifier associated with a respective student enrolled in the class.

20. The hardware server device of claim 16, wherein:
the threshold is satisfied when a number of the plurality of stub files in the share pool is less than a predefined amount; and
the threshold value is based on a multiple of an average number of users associated with the partition of the storage service.

* * * * *